US012631289B1

(12) United States Patent
Ward et al.

(10) Patent No.: US 12,631,289 B1
(45) Date of Patent: May 19, 2026

(54) INTEGRATED BRACKET ASSEMBLY WITH HEAD STOP FOR OVERHEAD DOORS

(71) Applicant: CLTC LLC, Atlanta, GA (US)

(72) Inventors: Ethan Ward, Carrollton, GA (US); Tony Ward, Carrollton, GA (US)

(73) Assignee: CLTC LLC, Carrollton, GA (US)

( * ) Notice: Subject to any disclaimer, the term of this patent is extended or adjusted under 35 U.S.C. 154(b) by 0 days.

(21) Appl. No.: 19/399,185

(22) Filed: Nov. 24, 2025

Related U.S. Application Data

(63) Continuation-in-part of application No. 19/301,880, filed on Aug. 15, 2025, now Pat. No. 12,480,345.

(51) Int. Cl.
*F16M 13/02* (2006.01)
*E06B 9/68* (2006.01)

(52) U.S. Cl.
CPC .............. *F16M 13/02* (2013.01); *E06B 9/68* (2013.01); *E06B 2009/6818* (2013.01)

(58) Field of Classification Search
CPC .... F16M 13/02; E06B 9/68; E06B 2009/6818
USPC ......................................................... 248/300
See application file for complete search history.

(56) References Cited

U.S. PATENT DOCUMENTS

| | | | |
|---|---|---|---|
| 3,213,924 A | 10/1965 | Crosswell | |
| 4,095,641 A * | 6/1978 | Olson ................... | E05D 15/165 |
| | | | 160/209 |
| 4,930,563 A * | 6/1990 | Finch ....................... | E06B 9/58 |
| | | | 160/133 |

| | | | |
|---|---|---|---|
| 5,172,744 A | 12/1992 | Finch | |
| 5,284,199 A * | 2/1994 | Finch ........................ | E06B 9/58 |
| | | | 160/133 |
| 5,474,117 A | 12/1995 | Henkenjohann | |
| 5,778,490 A | 7/1998 | Curtis | |
| 6,155,327 A | 12/2000 | Wells | |
| 6,283,193 B1 * | 9/2001 | Finch ..................... | E06B 9/115 |
| | | | 160/191 |
| 6,527,037 B2 | 3/2003 | Daus | |

(Continued)

FOREIGN PATENT DOCUMENTS

WO          2023122318          6/2023

OTHER PUBLICATIONS

Steel Blue; 9530 Series; https://cdn.prod.website-files.com/ 67056edddac9378636046a68/67056edddac9378636046c22_sb-9530- data%20sheet.pdf; [accessed Sep. 16, 2025].

*Primary Examiner* — Anita M King
(74) *Attorney, Agent, or Firm* — HULSEY P.C.

(57) ABSTRACT

A bracket assembly for overhead roll-up doors includes a bracket body, and a head stop extending from the bracket body. The head stop is configured to limit travel of a roll-up door. The head stop includes perforated sections that create a hinge line in the material, allowing bending or rotation relative to the bracket body. The perforated sections include small, precisely spaced holes enabling the head stop to bend or fold into position. The bracket body and head stop form a gap at their intersection, creating a natural hinge point for bending the head stop. The head stop includes punched holes for attaching to vertical guides and additional head stops. The bracket body includes a bracket opening to receive an axle, a tensioning drive, and guide tabs. The bracket body integrating the head stop reduces installation complexity and improves reliability compared to traditional separate component configurations.

20 Claims, 11 Drawing Sheets

(56) References Cited

U.S. PATENT DOCUMENTS

| | | | |
|---|---|---|---|
| 6,955,206 B2 | 10/2005 | Mullet et al. | |
| 6,959,751 B2 | 11/2005 | Savard | |
| 7,017,644 B1 | 3/2006 | Kraeutler | |
| 7,254,868 B2 | 8/2007 | Mullet | |
| 7,284,736 B2 | 10/2007 | Franssen | |
| 8,662,139 B2 | 3/2014 | Anthony et al. | |
| 9,206,634 B1 | 12/2015 | Prieto et al. | |
| 11,105,133 B2 * | 8/2021 | Sauve | E05D 15/242 |
| 12,264,523 B2 | 4/2025 | Bruckelmyer | |
| 12,480,345 B1 * | 11/2025 | Ward | E05D 15/22 |
| 2003/0230389 A1 * | 12/2003 | Savard | E06B 9/68 |
| | | | 160/133 |
| 2007/0079943 A1 | 4/2007 | Smith et al. | |
| 2024/0200403 A1 | 6/2024 | Humphrey et al. | |
| 2024/0376758 A1 | 11/2024 | Feng | |
| 2025/0043626 A1 | 2/2025 | Vangberg-Brinkmann | |
| 2025/0059827 A1 | 2/2025 | Nakoff et al. | |

* cited by examiner

100

104

102

110

112

700

704

702   718   722

706

712

724

714

715

710

726   728   720

718

722

724

726

728

720

INTEGRATED BRACKET ASSEMBLY WITH HEAD STOP FOR OVERHEAD DOORS

CROSS-REFERENCE TO RELATED APPLICATIONS

The present application is a continuation-in-part of U.S. application Ser. No. 19/301,880, filed Aug. 15, 2025, which is incorporated herein in its entirety and referenced thereto.

BACKGROUND OF THE INVENTION

Field of the Invention

The present invention relates generally to bracket assemblies for overhead door systems, and in particular, relates to an integrated bracket assembly with a built-in head stop for securing and controlling the movement of flexible door panels in roll-up and sectional overhead doors.

Description of the Prior Art

Roll-up doors are widely used in industrial and commercial settings due to their ease of operation and space-saving design. The roll-up doors provide secure and convenient access to enclosed spaces. The roll-up doors typically feature flexible door panels that move vertically along guide tracks to open and close entryways. These door systems commonly employ tensioning mechanisms to maintain proper door operation and counterbalance systems to assist in door movement. The structural integrity and proper alignment of these components are critical for safe and efficient door operation.

FIG. 1 and FIG. 2 show a perspective view and an exploded view, respectively, of a roll-up door system 10, in accordance with one exemplary embodiment in prior art. Roll-up door system 10 includes a roll-up door 12. Roll-up door 12 is formed from a metal sheet having multiple corrugations with horizontal hems. Roll-up door 12 selectively moves from a closed position as depicted in FIG. 1 to an open position (not shown) where roll-up door 12 is fully retracted and coiled about a plurality of drum wheels (not shown). The drum wheels attach to an axle 14 (FIG. 2) that rotatably supports a header (not shown) in a position above the opening. Axle 14 receives a tension spring or torsion spring 16. Further, roll-up door system 10 includes a tensioning bracket 18 that mounts at a side of roll-up door 12. FIG. 3 shows a front view of tensioning bracket 18, in accordance with prior art. Tensioning bracket 18 includes a bracket opening 28 that receives a bracket stop 20. Furthermore, tensioning bracket 18 includes a worm screw or tensioning drive 22. Tensioning drive 22 is positioned in an indentation of tensioning bracket 18 and held in place. Tension adjustments of tensioning bracket 18 are easily made and set by turning tensioning drive 22.

Further, roll-up door system 10 includes a head stop 24. Head stop 24 helps position bracket 18 and common roll-up door system components. As known, head stop 24 limits roll-up door's 12 travel when it's being opened, and helps to prevent roll-up door 12 from swinging too far and potentially damaging itself, surrounding structures, or causing injury. Typically, head stop 24 comes as a separate component and is connected to vertical guides 26 on both sides that receive roll-up door 12. Head stop 24 is connected to vertical guides 26 using fasteners 25, as indicated in FIG. 2. Specifically, head stop 24 comes as a separate component that requires attachment to vertical guides 26 using additional fasteners 25. This separate component approach necessitates precise alignment during installation and creates multiple connection points that may be subject to loosening over time due to operational vibrations. Further, tensioning bracket 18 includes holes 30 for securing the bracket to vertical guides or support structures. Tensioning bracket 18 also includes guide tabs 32 that align and connect the bracket to the vertical guides ensuring proper positioning during installation. Tensioning bracket 18 includes a folded hem 34 that adds structural rigidity while eliminating sharp edges for improved safety during handling and installation.

Several roll-up door systems in prior art disclosed different types of head stops used to connect to vertical guides. One such example is disclosed in a PCT Publication No. 2023122318, entitled "Roll up door spring tensioning device" ("the '318 Publication"). The '318 Publication discloses a roll up door tensioning device comprising a bracket having a first door side and a second outer side connects an axle to a support structure. A spring plate on the bracket second outer side has an inner circumference fixedly attached to a collared bearing assembly for rotatably supporting an axle through the bracket. The spring plate is fixedly attached to a tensioning wheel on the bracket first door side. A tensioning wheel on the bracket first door side forms a drive stop mechanism with a tensioning drive.

Another example is disclosed in a United States Publication No. 20240200403, entitled "Rollup door tension device" ("the '403 Publication"). The '403 Publication discloses vertical guides having a head stop at the height about below a door package assembly. The head stop works as to secure the vertical guides to the wall. The head stop has a square with chamfered corners, and the one side of the head stop is opened to embrace a vertical guide. The end of the opened side has a little curved into the head stop so the head stop can catch the vertical guides.

Yet another example is disclosed in a U.S. Pat. No. 7,017,644, entitled "Multipurpose connection console for material handling gate" ("the '644 Patent"). The '644 Patent") discloses a goods-handling door incorporating a bracket on each side of its top portion. The brackets support a shaft for rolling up the door. The invention introduces a one-piece, molded bracket that offers multiple functions: guiding the curtain, fixing various accessories, thereby ensuring structural precision and easy maintenance.

Although the above discussed disclosures are useful, they still have problems and present incomplete solutions. The use of separate head stops increases installation complexity and time, requiring technicians to align and secure additional parts with multiple fasteners. Each connection point introduces a potential failure location where fasteners loosen over time due to door vibration and movement. Further, improper installation of separate head stops frequently occurs in field applications, leading to misalignment issues, premature component wear, and potential safety hazards. For instance, failure to properly install the head stops may result in the roll-up door to travel beyond the vertical guides resulting in damage to the roll-up door and/or personal injury. When installers rush or lack proper training, they incorrectly position the head stop or use insufficient fasteners, compromising the door system's reliability and performance.

Therefore, there is a need in the art to provide an improved bracket assembly that integrates a head stop directly into a bracket body and reduces parts count, simplifies installation, improves reliability, and lowers manufacturing costs while eliminating the separate fasteners and alignment challenges associated with conventional multi-component assemblies.

SUMMARY OF THE INVENTION

It is an object of the present invention to provide a bracket assembly for a roll-up door system that integrates a head stop with a bracket body.

It is another object of the present invention to provide a head stop with perforated sections or indents or scored lines or integrated flex features that allow bending or rotation of the head stop relative to the bracket body.

It is another object of the present invention to provide a bracket assembly with multiple punched holes for attaching additional head stops and/or securing the head stop to vertical guides.

In order to achieve one or more objectives, the present invention provides a unitary bracket assembly comprising a bracket body defining an internal cavity housing a torque-adjusting member. The bracket body incorporates an axle-bearing seat and an integrated head stop, wherein the head stop is formed from and continuous with the bracket body to limit travel of a door curtain. The head stop comprises a plurality of perforated sections that create a hinge line in the material of the head stop to allow bending or rotation of the head stop relative to the bracket body. The perforated sections comprise a series of small, precisely spaced holes that enable the head stop to bend or fold into position. The bracket body and the head stop form a gap at an intersection between the head stop and the bracket body to create a natural hinge point for positioning the head stop.

In one aspect of the present invention, the torque-adjusting member comprises a worm screw and worm wheel, ratchet and pawl, cam ratchet, Geneva mechanism, torsion element, or other tensioning mechanism. The torque-adjusting member comprises an anti-back-drive clutch or one-way retention mechanism to maintain tension under load. The torque-adjusting member is configured as a removable or replaceable cartridge that can be inserted or attached into the internal cavity of the bracket body. The bracket assembly further comprises reinforcement ribs formed adjacent to the internal cavity and bearing seat to distribute load and prevent crack propagation.

In another aspect of the invention, the bracket body and integrated head stop are formed as a single, continuous piece of material to define a unitary structure. In some embodiments, the bracket body comprises two or more differing materials permanently bonded, fused, or co-formed during manufacturing to create an inseparable structural assembly. The bracket assembly further comprises a mounting flange or interface configured to attach the bracket assembly to a door jamb, frame, or support structure.

In a further aspect of the invention, the bracket assembly comprises a bracket body and a head stop extending from the bracket body, wherein the head stop comprises a plurality of perforated sections that create a hinge line in the material of the head stop to allow bending or rotation of the head stop relative to the bracket body. The bracket assembly includes an axle stop mechanism configured to releasably secure an axle to the bracket body without requiring fasteners or tools. The axle stop mechanism includes a spring-loaded push button or plunger, or snap-fit element, interference-fit element, push-to-fit connector, or other releasable retention feature. The axle stop mechanism includes a safety catch or lock reset feature and is configured for tool-free manual operation. The axle stop mechanism is integrated into or onto a bracket stop of the bracket body.

The present invention also provides a bracket assembly comprising a bracket body and a head stop extending from the bracket body, wherein the head stop comprises a plurality of perforated sections that create a hinge line in the material of the head stop to allow bending or rotation of the head stop relative to the bracket body. The bracket assembly comprises an integrated sensor cavity or mounting port formed in, on, or around the bracket body and positioned adjacent to an axle opening or internal tensioning cavity. The sensor cavity or mounting port is integral to, or mechanically attached to, the bracket body and is configured to receive and retain a torque, strain, position, or vibration sensor. The bracket further comprises an interface configured to transmit sensor or control signals to an external access controller.

In another aspect of the present invention, the sensor cavity comprises cable routing channels extending through the bracket body configured to protect or isolate electrical conductors from environmental exposure, mechanical damage, or vibration. The cable routing channels are sealed to prevent ingress of dust or moisture. The sensor cavity or mounting location comprises a co-molded, bonded, or fitted insert formed of a material configured to support and isolate the sensor from vibration, impact, or mechanical shock. The interface is configured to enable selective locking, unlocking, or actuation of a door or related access system upon receiving an authenticated signal from a remote-control device.

In a further aspect of the present invention, the bracket assembly includes a first sensor positioned on the bracket body and a second sensor positioned on the head stop, the first and second sensors configured to monitor operational parameters of a roll-up door system. The bracket assembly further comprises a third sensor positioned on a bottom bar; the third sensor configured to provide additional monitoring capabilities for enhanced system reliability.

In yet another aspect of the present invention, the bracket assembly includes a bolt cartridge positioned on the bracket body and configured to provide a mounting interface for securing components to the bracket assembly. The bracket assembly may include interlocking tabs or self-engaging features that are stamped or formed integrally with the head stop, comprising a plurality of interlocking tongues, protrusions, or snap-fit tabs configured to self-engage upon bending or rotation of the head stop into its operative position, thereby locking the head stop in place and eliminating the need for additional fasteners.

In some aspects, the bracket assembly includes a universal configuration with removable features for customization. The bracket body includes a plurality of breakaway tabs positioned on the bracket body and configured to be selectively removed based on installation requirements. The bracket body also includes a plurality of removable knockouts positioned around an axle bearing seat, the removable knockouts being configured to be selectively removed to accommodate multiple axle diameters, door configurations, or guide profiles. The bracket assembly secures moveable panels, curtains, sheets, flexible materials, or materials that allow for passable entry or exit within vertical or horizontal guide/track support systems.

In another aspect of the present invention, the bracket assembly may be configured as a universal retrofit bracket designed to accommodate multiple door system configurations without requiring separate bracket models for different installations. The bracket body may include a plurality of removable knockouts positioned around the axle bearing seat, adjacent structural portions, or other mounting locations. These removable knockouts may be defined by perforation lines, reduced-thickness zones, or scored patterns that enable selective removal with or without tools based on specific installation requirements. The removable knockouts may be dimensioned to provide a range of fitment options for differing axle diameters, bearing sizes, shaft configurations, or guide profiles, allowing a single bracket design to serve multiple applications.

The universal bracket configuration includes breakaway tabs positioned at various locations on the bracket body, where each breakaway tab is selectively removed to customize the bracket for specific door types, mounting configurations, or operational requirements. The breakaway tabs include integral reinforcement features configured to maintain structural integrity when unremoved, while providing clean separation points when removal is desired. The removable knockouts are configured to accept modular inserts, sensors, fastener housings, or other components when removed, transforming the knockout location into a functional mounting point. This universal design approach reduces inventory requirements for installers and distributors by consolidating multiple bracket variations into a single adaptable component, while maintaining the structural performance and reliability characteristics of application-specific brackets.

In one advantageous feature of the present invention, the integrated bracket assembly with head stop significantly reduces installation time and complexity by eliminating separate components and fasteners. The unified design allows quicker and more accurate positioning of the head stop during installation. Further, the unified design eliminates the need for separate fabrication and mechanical fastening (e.g., bolts, clips, rivets), reducing the risk of improper installation, which could lead to misalignment issues, premature component wear, and potential safety hazards.

In another advantageous feature of the present invention, the perforated sections on the head stop provide enhanced flexibility for adjusting the head stop position without compromising structural integrity. The perforated sections allow installers to fine-tune the door's upper travel limit on-site without requiring additional tools or components. The bracket assembly can have additional holes punched into it to allow different operating systems to attach to the bracket assembly.

In yet another advantageous feature of the present invention, the multiple punched holes on the head stop offer versatility for mounting configurations. This design may accommodate various door sizes and installation requirements, potentially reducing the need for multiple bracket models in inventory. The additional holes or mounting features can be punched or attached into, onto, or next to the tensioning bracket and/or non-tensioning bracket during the initial manufacturing process, post-manufacturing, pre-installation, and/or post-installation to allow for additional brackets, mounts, and/or tensioners to be separately or additionally added to the bracket assembly.

In yet another advantageous feature of the present invention, the unitary construction of the bracket body and head stop enhances overall system reliability by reducing the number of potential failure points. This integrated design eliminates connection points where fasteners might loosen over time due to door vibration and movement, thereby improving reliability and extending the service life of both the roll-up door and the bracket assembly.

In another advantageous feature of the present invention, the unitary bracket body with internal cavity housing the torque-adjusting member provides enhanced protection for tensioning components while maintaining accessibility for adjustments. The enclosed design shields the torque-adjusting mechanism from environmental contaminants, dust, and moisture, extending component life and reducing maintenance frequency compared to exposed tensioning systems.

In yet another advantageous feature of the present invention, the anti-back-drive clutch or one-way retention mechanism integrated within the torque-adjusting member prevents unwanted tension loss during door operation. This feature maintains consistent door positioning and reduces the need for frequent tension readjustments, improving operational reliability and reducing service calls.

In a further advantageous feature of the present invention, the removable or replaceable cartridge configuration of the torque-adjusting member facilitates field maintenance and component replacement without requiring complete bracket replacement. This modular approach reduces downtime during service operations and allows for cost-effective upgrades or repairs of tensioning components.

In another advantageous feature of the present invention, the quick-release axle stop mechanism eliminates the need for traditional fastening methods such as cotter pins or set screws. The push-button actuator or spring-pin detent system enables rapid installation and removal during maintenance while providing secure engagement during normal operation, reducing installation time and improving serviceability.

In yet another advantageous feature of the present invention, the integrated sensor cavity or mounting port enables real-time monitoring of door system performance without requiring external sensor mounting hardware. The sensor integration capabilities facilitate predictive maintenance programs, operational optimization, and integration with building management systems, reducing unexpected failures and improving overall system efficiency.

In a further advantageous feature of the present invention, the electrical interface configured to transmit sensor signals enables remote monitoring and control capabilities. This feature allows building operators to monitor door performance, receive maintenance alerts, and integrate the door system with automated building controls, improving operational efficiency and reducing manual inspection requirements.

In another advantageous feature of the present invention, the reinforcement ribs formed adjacent to the internal cavity and bearing seat distribute operational loads more effectively than traditional bracket designs. This structural enhancement improves durability under repeated stress cycles while maintaining the integrated design benefits, extending service life and reducing replacement frequency.

These and other objects of the present invention will be apparent from review of the following specification and the accompanying drawings.

DETAILED DESCRIPTION OF THE PREFERRED EMBODIMENT

Figure 1:
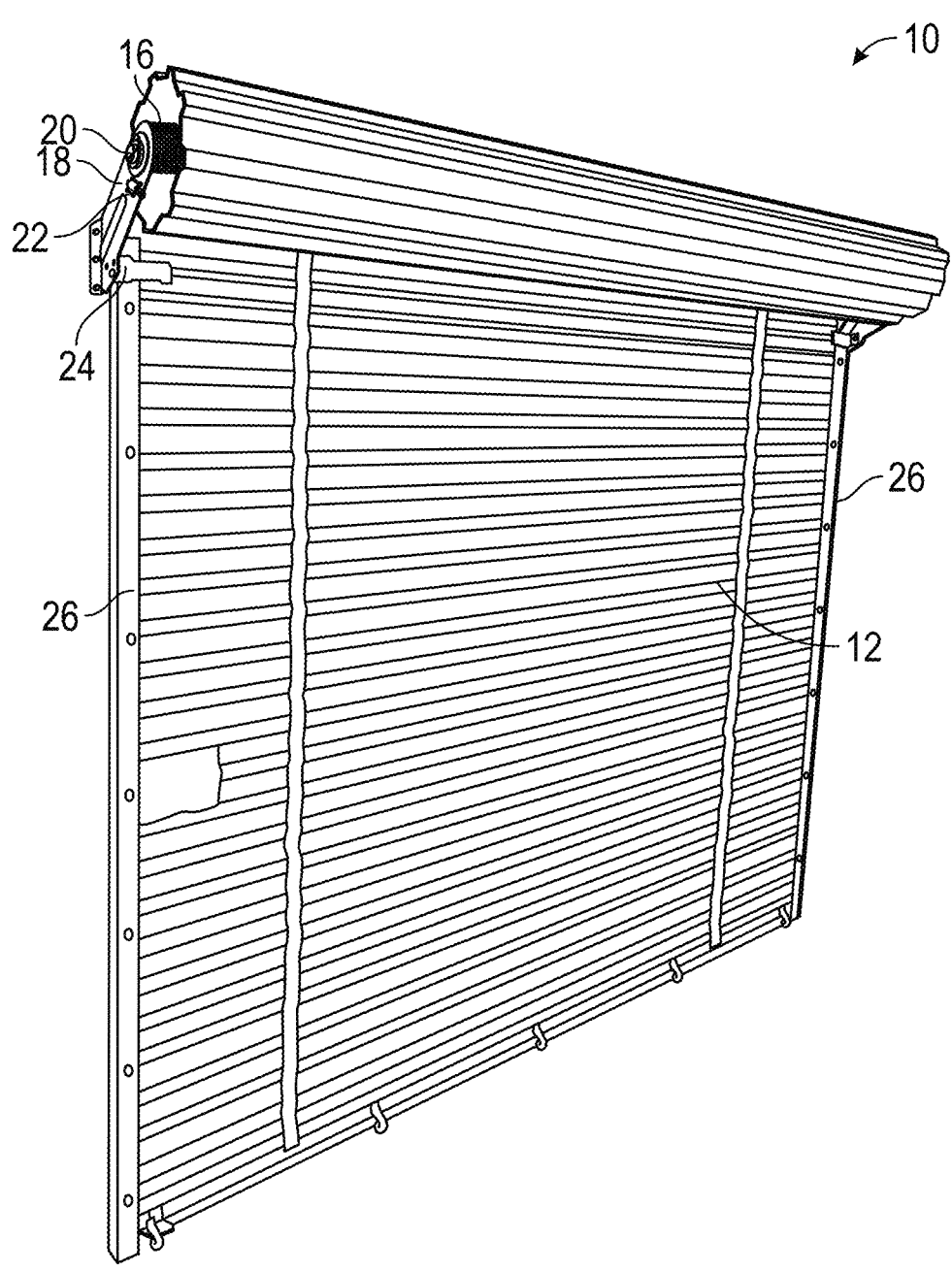
FIG. 1 and FIG. 2 illustrate a perspective view and an exploded view, respectively, of a roll-up door system, in accordance with prior art.
Figure 3:
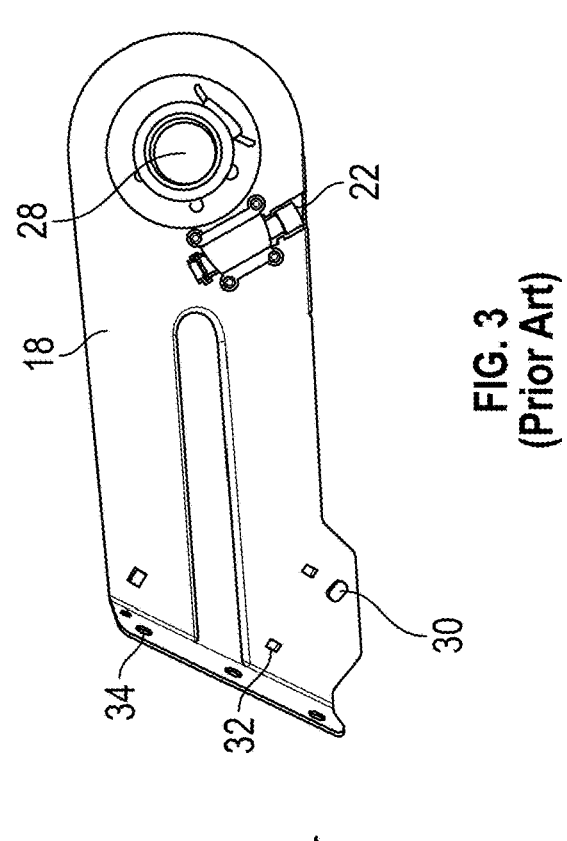
FIG. 3 illustrates a tensioning bracket, in accordance with prior art.
Figure 2:
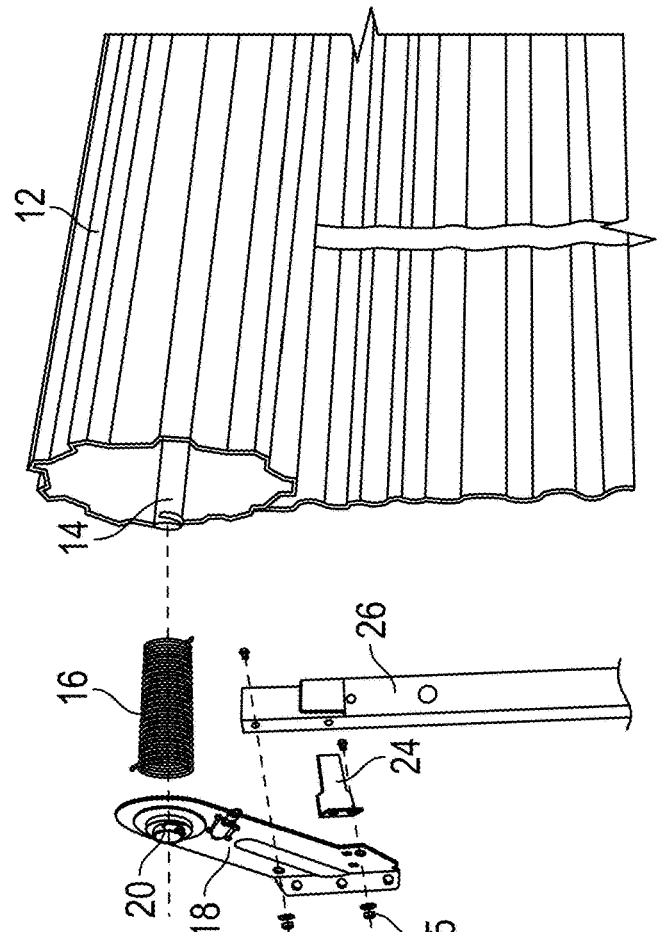

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed bracket assembly. However, it will be apparent to those skilled in the art that the presently disclosed invention may be practiced without these specific details. In some instances, well-known structures and devices are shown in functional or conceptual diagram form in order to avoid obscuring the concepts of the presently disclosed bracket assembly.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

It will be understood that, although the terms first, second, third, etc. may be used herein to describe various elements, components, regions, and/or sections, these elements, components, regions, and/or sections should not be limited by these terms. These terms are only used to distinguish one element, component, region, and/or section from another element, component, region, and/or section.

It will be understood that the elements, components, regions, and sections depicted in the figures are not necessarily drawn to scale.

Although the present invention provides a description of a bracket assembly, it is to be further understood that numerous changes may arise in the details of the embodiments of the bracket assembly. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

Various features and embodiments of a bracket assembly are explained in conjunction with the description of FIGURES (FIGS. 4-18.

Figure 4:
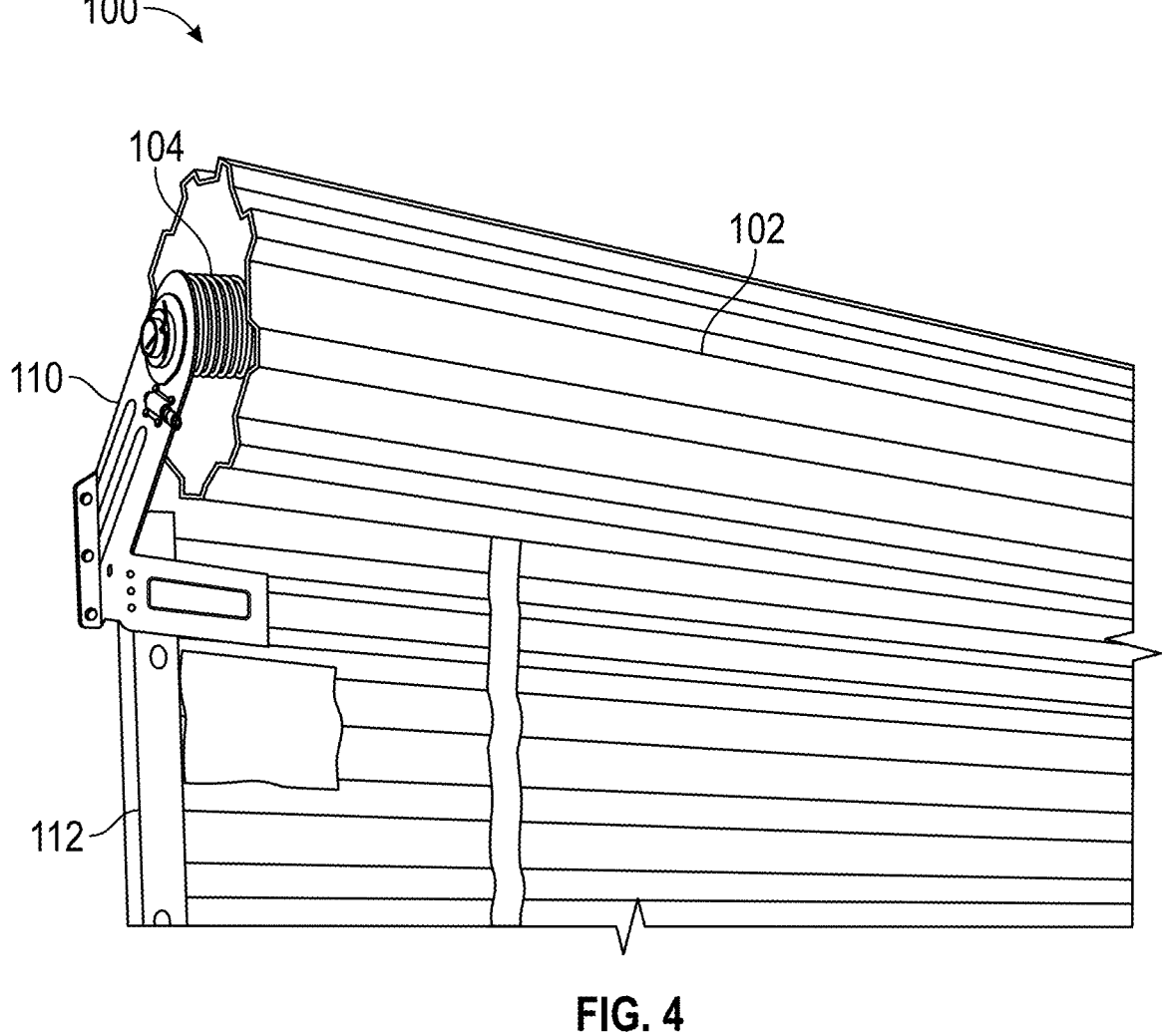
FIG. 4 illustrates a perspective view of a roll-up door system incorporating a bracket assembly, in accordance with one embodiment of the present invention.
Figure 6:
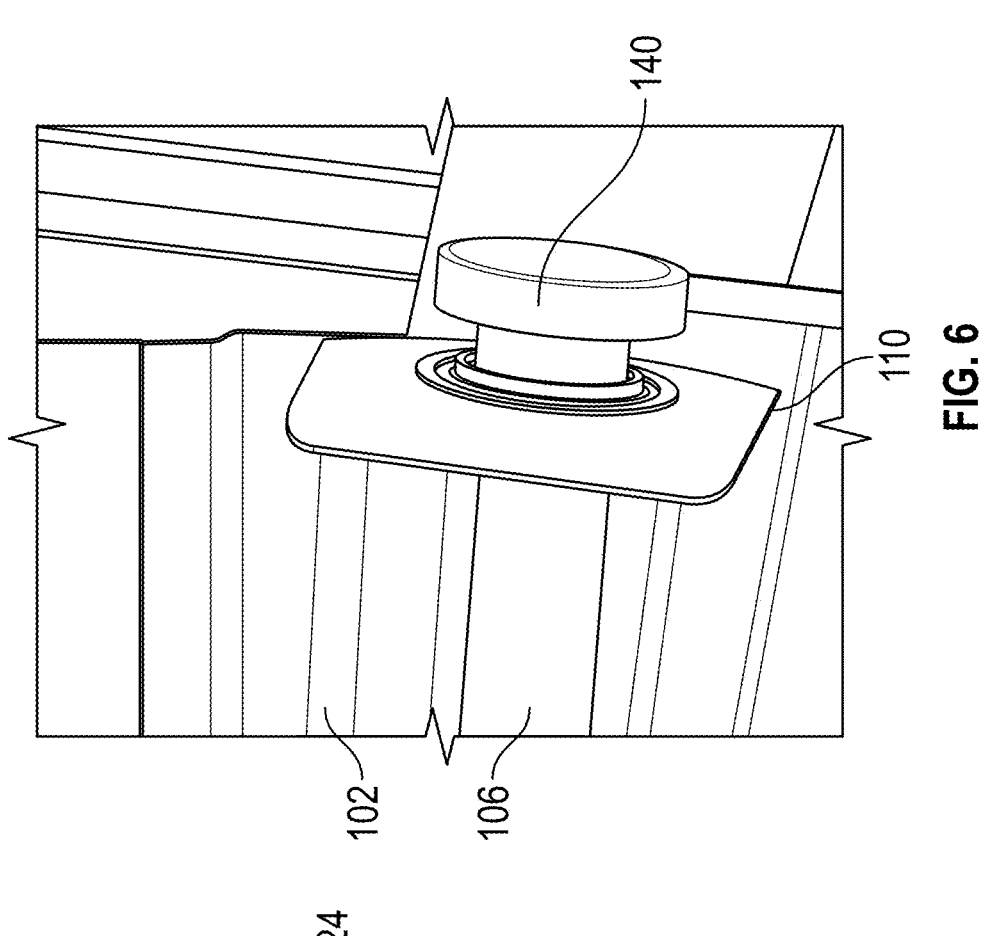
FIG. 6 illustrates a bracket stop connected to an axle of the roll-up door system, in accordance with one embodiment of the present invention.

FIG. 4 shows a roll-up door system 100 incorporating a bracket assembly 110, in accordance with one exemplary embodiment of the present invention. Roll-up door system 100 includes a roll-up door 102. Roll-up door 102 is formed from a metal sheet having multiple corrugations with horizontal hems. Roll-up door 102 selectively moves from a closed position as depicted in FIG. 4 to an open position (not shown) where roll-up door 102 is fully retracted and coiled about a plurality of drum wheels (not shown). The drum wheels are attached to an axle 106 (as illustrated in FIG. 6) that is configured to rotatably support a header (not shown) in a position above the opening. The axle receives a tension spring or torsion spring 104. Further, roll-up door system 100 includes a bracket assembly 110 that mounts at a side of roll-up door 102. Here, bracket assembly 110 removably connects to vertical guides 112.

Figure 5:
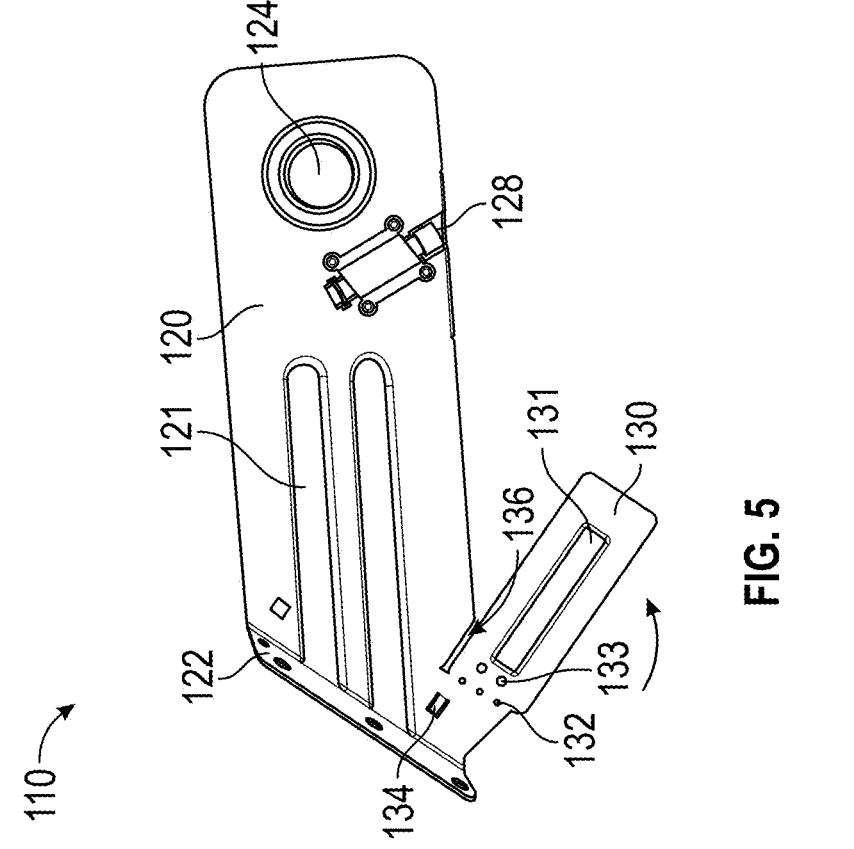
FIG. 5 illustrates a front view of a bracket assembly with an integrated head stop, in accordance with one embodiment of the present invention.

FIG. 5 shows a front view of bracket assembly 110, in accordance with one embodiment of the present invention. Bracket assembly 110 includes a bracket body 120. Bracket body 120 includes a plurality of first stiffening members or first stiffeners 121. In one example, plurality of first stiffening members 121 include two first stiffening members 121. Here, first stiffening members 121 are embossed in bracket body 120. Plurality of first stiffening members 121 extend from folded hem 122 of bracket body 120. Folded hem 122 forms/stamps around the perimeter of bracket body 120. Folded hem 122 adds rigidity and enhances operator safety during installation and operation. Folded hem 122 includes bolt holds (i.e., openings formed in folded hem 122) for connecting bracket body 120 to the header or a support structure (not shown) above the header to mount, raise (roll), and lower (unroll) roll-up door 102.

Figure 7:
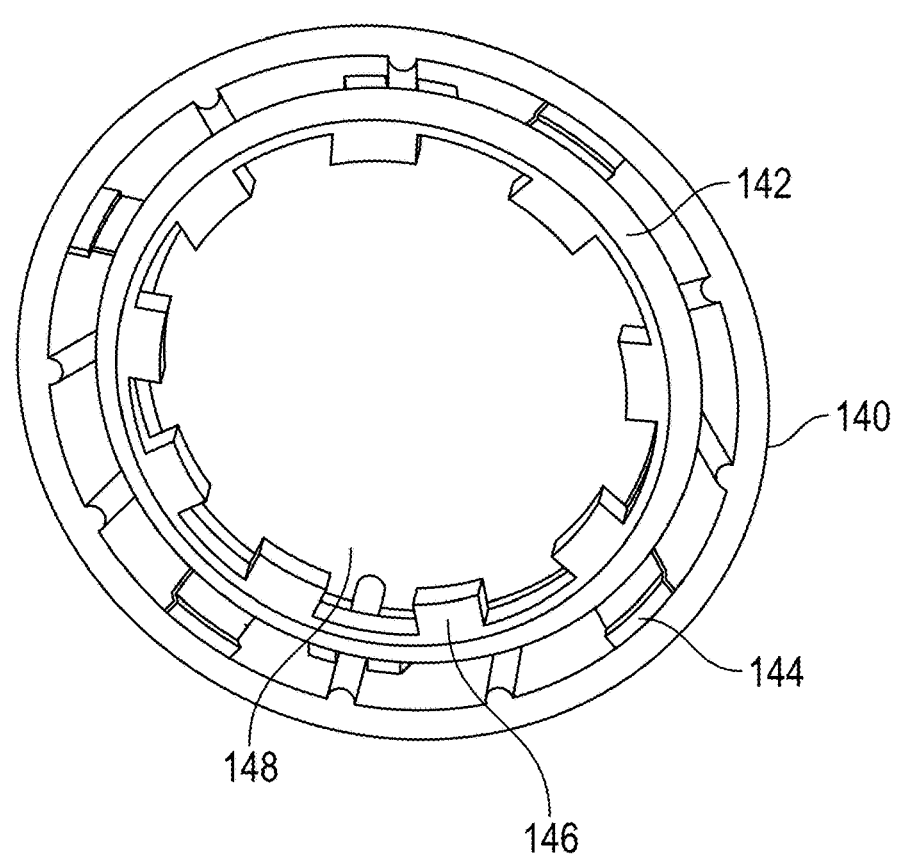
FIG. 7 illustrates the bracket stop, in accordance with one embodiment of the present invention.

Bracket body 120 includes a bracket opening 124 that receives axle 106 to which bracket stop 140 connects to (as illustrated in FIG. 6) Here, bracket opening 124 indicates a circumferential hole formed in bracket body 120 through which axle 106 passes to allow attachment tabs (not shown) and a tensioning wheel (not shown) to rotate freely. FIG. 6 shows the feature of axle 106 going through bracket opening 124 of bracket body 120 and bracket stop 140 attached at a distal end of axle 106. In the present embodiment, the bracket stop or cap 140 serves as a depth stop for accurate axle pipe positioning and as a safety cover, eliminating the need for drilled holes or cotter pins. FIG. 7 shows the front view of bracket stop 140, in accordance with one embodiment of the present invention. As can be seen, bracket stop 140 includes an inner rim 142. Inner rim 142 comes in a circular configuration and encompasses tabs 144. Tabs 144 are formed or attached on inner rim 142. Tabs 144 are used to secure threaded connections/self-threading fastener/push-on mechanisms with lock or retaining rings inside or on bracket stop 140. Inner rim 142 forms an axle receiving portion 148. Axle receiving portion 148 defines an area or space for receiving axle 106. In one implementation, inner rim 142 encompasses teeth 146 facing axle receiving portion 148. Teeth 146 as retainer ring for holding axle 106 in place when bracket stop 140 is secured at the distal end of axle 106.

Bracket stop 140 attaches permanently or removably to the axle pipe 106 using various methods, including, but not limited to, threaded connections, self-threading washers, push-on mechanisms with lock or retaining rings, screws, nails, or adhesives. This allows for easy installation and removal during maintenance while ensuring the bracket stop remains securely fixed during door operation. Further, the bracket stop 140 acts as a depth gauge, limiter, and locator. The bracket stop 140 precisely positions bracket body 120 on axle 106, ensuring sufficient clearance for side-to-side movement without binding between the door panel and stopping mechanism during normal operation. In other words, bracket stop 140 is used as a depth locator on axle 106 to ensure bracket 110 can only move the required distance on axle 106. The precise positioning helps in smooth door function and longevity of components.

Additionally, bracket stop 140 secures bracket body 120 on axle 106, preventing it from sliding off. This eliminates the need for traditional fastening methods like cotter pins, nails, or screws inserted through drilled holes in the axle. By removing the requirement for the additional fasteners, bracket stop 140 simplifies installation and reduces potential points of failure.

Further, bracket stop 140 eliminates risks associated with traditional mounting methods. Bracket stop 140 removes the possibility of improper hole placement when drilling, cutting, or punching holes in the axle. This prevents weakening of the axle structure and ensures consistent, reliable mounting across installations. Furthermore, bracket stop 140 preserves the structural integrity of axle 106 and reduces the risk of corrosion or fatigue at fastener points by eliminating the need for the additional holes.

Referring back to FIG. 5, bracket body 120 includes a worm screw or tensioning drive 128. Tensioning drive 128 positions in an indentation of tensioning bracket 18 and holds in place. Turning tensioning drive 128 easily makes and sets tension adjustments of bracket body 120. The tensioning system can include but is not limited to ratchet and pawl, worm screw and worm wheel, Geneva wheel and drive wheel, ratchet assembly, worm drive, drive gear, or cam ratchet mechanisms.

In accordance with the present embodiment, bracket assembly 110 includes a head stop 130 that directly incorporates, manufactures, stamps, welds, molds, or permanently attaches to bracket body 120 without the use of fasteners, bolts, staples or other attachment devices. The integration may be achieved through various manufacturing processes including progressive stamping, where bracket body 120 and head stop 130 form from a single piece of material in sequential operations, or through welding, brazing, or other permanent joining methods that create a unitary structure. Head stop 130 comes in a rectangular, square, triangular, or any other shape. The shape of head stop 130 may be optimized based on the specific door application, load requirements, and installation constraints. Head stop 130 extends at the bottom of bracket body 120. Head stop 130 encompasses a second stiffening member or second stiffener 131 extending along the length of head stop 130. Here, second stiffening member 131 is embossed in head stop 130. Second stiffening member 131 provides required strength for retaining the shape of head stop 130.

Head stop 130 includes a plurality of perforated sections 132. Perforated sections 132 indicate a series of small, precisely spaced holes that create a hinge line in the material of head stop 130. The pattern of perforated sections 132 may be customized based on material thickness, desired bending radius, and required strength characteristics. Head stop 130 adjusts through bending or rotation at perforated sections 132. In one example, perforated sections 132 may be replaced by indents or scored lines or integrated flex features that create a predetermined hinge line to allow bending or rotation of head stop 130 relative to bracket body 120.

Further, head stop 130 includes a plurality of punched holes 133. Punched holes 133 are slots provided in various shapes and sizes to accommodate various fastener types. Here, punched holes 133 position away from perforated sections 132. Punched holes 133 are configured to receive fasteners (not shown) to secure head stop 130 to vertical guides or guide rails 112 once head stop 130 bends into position.

In some cases, head stop 130 presents a gap 136 at the intersection with bracket body 120. Gap 136 allows bending of head stop 130 with respect to bracket body 120. In other words, gap 136 creates a natural hinge point that facilitates precise positioning without requiring additional components. Gap 136 may be formed during the initial manufacturing process or created through subsequent machining operations, and its dimensions may be optimized to provide the desired bending characteristics while maintaining structural integrity. FIG. 4 shows the feature of head stop 130 bent with respect to bracket body 120 to limit the travel of roll-up door 102.

In some cases, bracket body 120 includes a plurality of guide tabs 134. Guide tabs 134 may be formed integrally with bracket body 120. Guide tabs 134 help connect bracket body 120 and common components of roll-up door system 100 to vertical guides 112.

Bracket assembly 110 including bracket body 120 and head stop 130 formed from metal such as steel, aluminum, or other rigid materials capable of withstanding repeated mechanical stress. The material selection may be optimized based on environmental conditions, load requirements, and cost considerations. Steel provides high strength and durability, while aluminum offers corrosion resistance and lighter weight. Other materials such as stainless steel, galvanized steel, or composite materials may be used for specific applications. In some cases, bracket assembly 110 is manufactured by stamping, molding, or casting to create a unitary structure with precise dimensions. Progressive stamping allows for high-volume production with consistent quality, while casting may be preferred for complex geometries or specialized material requirements. The integrated design of bracket assembly 110 with head stop 130 provides a unified structure that controls and supports roll-up door 102. This configuration eliminates the need for fasteners to connect head stop 130 to bracket assembly 110. Further, the integrated bracket assembly 110 simplifies installation and maintenance procedures. Furthermore, the unitary construction reduces the risk of component misalignment during installation and prevents loosening of connections over time due to door vibration and movement. Additionally, the integrated bracket assembly 110 reduces inventory management challenges by consolidating multiple parts into a single component. Bracket assembly 110 can be used with overhead doors, flexible doors, vertical moving walls and/or pass-through entryways, providing versatility across different door system types and applications.

An operator (not shown) bends head stop 130 using a known or specialized tool (not shown). The tool applies force to head stop 130, causing it to bend at perforated sections 132. Perforated sections 132, containing small, evenly spaced holes, form a hinge line in head stop 130's material. This hinge line allows head stop 130 to bend or rotate relative to bracket body 120. After bending, head stop 130 sits at about a right angle i.e., becoming perpendicularly to bracket body 120, as shown in FIG. 4. Here, gap 136 helps with bending by creating a natural hinge point. This design allows precise placement of head stop 130 without extra parts. The bent head stop 130 stops roll-up door 102 from moving too far upward. The bent head stop 130 creates a physical barrier that prevents roll-up door 102 from extending too much when opening. This keeps roll-up door 102 properly aligned in vertical guides 112 and prevents damage to the door and nearby structures. As specified above, bracket assembly 110's design directly joins head stop 130 directly to bracket body 120, creating an adjustable stop without separate fasteners or parts. This one-piece construction makes roll-up door system 100 more durable and reliable by reducing possible failure points and removing connections that might loosen from door vibration and movement.

Figure 8:
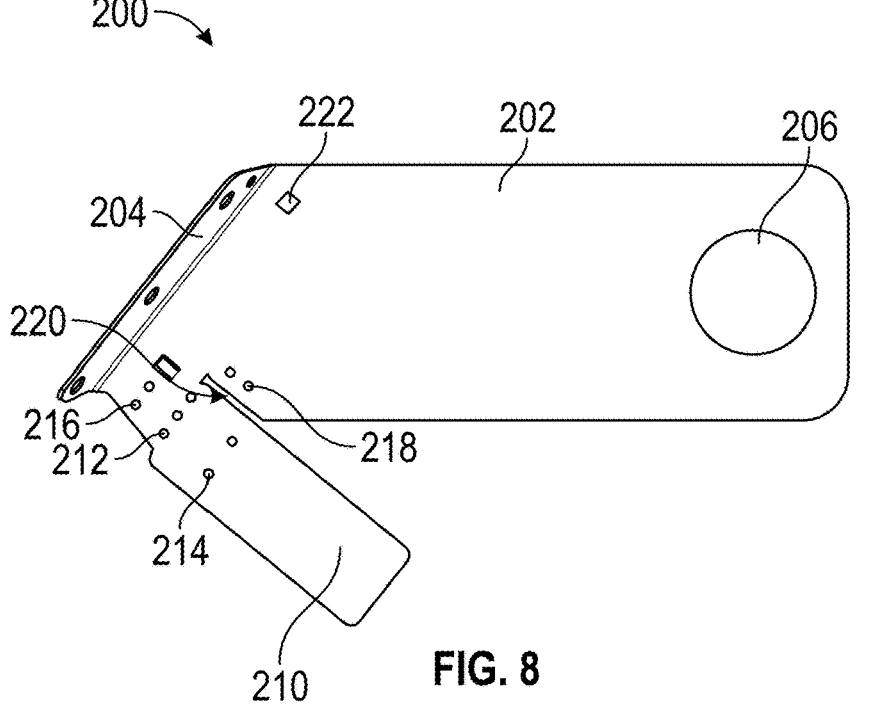
FIG. 8 illustrates a front view of another bracket assembly with an integrated head stop, in accordance with another embodiment of the present invention.

FIG. 8 shows a front view of a bracket assembly 200, in accordance with another embodiment of the present invention. Bracket assembly 200 includes a bracket body 202. Bracket assembly 200 is constructed from stamped steel or die-cast aluminum or other materials with a thickness sufficient to withstand operational stresses. Bracket assembly 200 includes a bracket body 202. Bracket body 202 includes a folded hem 204. Folded hem 204 is formed/stamped around the perimeter of bracket body 202. Folded hem 204 adds rigidity and enhances operator safety during installation and operation. Folded hem 204 has bolt holes (i.e., openings formed in folded hem 204) for connecting bracket body 202 to the header or a support structure (not shown) above the header to mount, raise (roll), and lower (unroll) roll-up door 102. Bracket body 202 includes a bracket opening 206 that receives an axle (not shown) to which a bracket stop (not shown) connects to. Here, bracket opening 206 indicates a circumferential hole formed in bracket body 202 through which the axle passes to allow attachment tabs (not shown) and a tensioning wheel (not shown) to rotate freely. In the present embodiment, the bracket stop is a cap that uses a retaining ring, self-cutting/threading fastener to secure bracket body 202 within/on the axle. This ensures that bracket body 202 can only move the required space on the axle. Here, the bracket stop/cap acts as a safety cover during installation and adjustments to protect the operator from injury. Further, the bracket stop removes the need to drill holes in axle 106 and use a cotter pin or other fasteners to secure bracket body 202 on the axle.

In accordance with the present embodiment, bracket assembly 200 includes a head stop 210 that directly incorporates, manufactures, stamps, molds, or permanently attaches to bracket body 202 without the use of fasteners, bolts, staples or other attachment devices. Head stop 210 comes in a rectangular, square, triangular, or any other shape. Head stop 210 extends at the bottom of bracket body 202. Here, head stop 210 extends from the bracket body 202, forming a continuous piece with the main structure and eliminating potential failure points that exist with separate components. Head stop 210 includes a plurality of perforated sections 212. Perforated sections 212 indicate a series of small, precisely spaced holes that create a hinge line in the material of head stop 210. Head stop 210 adjusts through bending or rotation at perforated sections 212. In other words, perforated sections 212 allow head stop 210 to bend or fold into position, creating a living hinge effect that maintains structural integrity while enabling adjustment.

Further, head stop 210 includes a plurality of first punched holes 214. First punched holes 214 are circular or slotted to accommodate various fastener types. Here, first punched holes 214 position away from perforated sections 212. First punched holes 214 are configured to receive fasteners (not shown) to secure head stop 210 to vertical guides or guide rails 112 once head stop 210 bends into position.

Further, head stop 210 includes a plurality of second punched holes 216. Second punched holes 216 are circular or slotted to accommodate various fastener types. Second punched holes 216 position adjacent to perforated sections 212 and opposite first punched holes 214. Second punched holes 216 attach additional head stops (not shown) allowing for different door opening heights and different operating systems.

Furthermore, head stop 210 includes a plurality of third punched holes 218. Third punched holes 218 position adjacent to perforated sections 212 and perpendicularly to first punched holes 214 and second punched holes 216. Third punched holes 218 attach additional head stops (not shown) allowing for different door opening heights and different operating systems. Second punched holes 216 and third punched holes 218 allow customization based on specific installation requirements and can be punched during the initial manufacturing process, post-manufacturing, pre-installation, and/or post installation.

Bracket assembly 200 offers flexibility in installation and configuration. The integrated head stop 210 simplifies the initial setup and punched holes 214, 216, 218 allow customization based on specific door system requirements. The unitary construction eliminates separate head stop components and their associated fasteners, reducing installation time and minimizing the risk of component failure due to vibration or improper assembly. The strategic placement of mounting holes enables secure attachment while maintaining the structural integrity of the assembly. Bracket assembly 200 can have multiple head stops directly manufactured into the bracket for overhead doors, allowing for different door opening heights.

In addition, head stop 210 presents a gap 220 at the intersection with bracket body 202. Gap 220 allows bending of head stop 210 with respect to bracket body 202. In other words, gap 220 creates a natural hinge point that facilitates precise positioning without requiring additional components.

In some cases, bracket body 202 includes a plurality of guide tabs 222. Guide tabs 222 help to connect bracket body 202 and common components of roll-up door system 100 to vertical guides 112.

Figure 9:
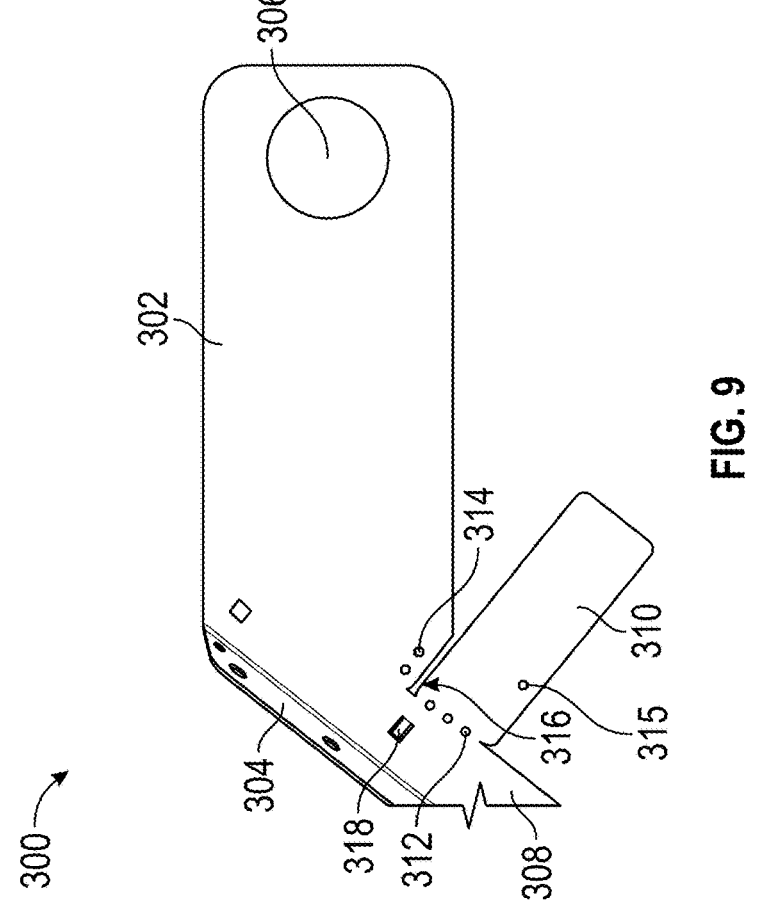
FIG. 9 illustrates a front view of a bracket assembly with an extending section and a head stop, in accordance with another embodiment of the present invention.

FIG. 9 shows a front view of a bracket assembly 300 with an extended section 308 having a head stop 310 that directly incorporates, manufactures, stamps, molds, or permanently attaches to extending section 308 without the use of fasteners, bolts, staples or other attachment devices, in accordance with another embodiment of the present invention. Bracket assembly 300 includes a bracket body 302. Bracket body 302 includes a folded hem 304. Bracket body 302 includes a bracket opening 306 that receives an axle (not shown) to which a bracket stop (not shown) connects to (not shown). Bracket body 302 has an extending section 308 that extends below bracket body 302, creating an L-shaped or angled profile that provides additional mounting options.

In the present embodiment, extending section 308 includes a head stop 310. Head stop 310 extends from extending section 308 and positions below bracket body 302. Head stop 310 includes a plurality of perforated sections 312. Perforated sections 312 indicate a series of small, precisely spaced holes that create a hinge line in the material of head stop 310. Head stop 310 adjusts through bending or rotation at perforated sections 312. In other words, perforated sections 312 allow head stop 310 to bend or fold into position.

Further, head stop 310 includes at least one first punched hole 315. First punched hole 315 is circular or slotted to accommodate various fastener types. Here, first punched hole 315 positions away from perforated sections 312. First punched hole 315 receives a fastener (not shown) to secure head stop 310 to vertical guides or guide rails 112 once head stop 310 bends into position.

Additionally, head stop 310 includes a plurality of second punched holes 314. Second punched holes 314 position adjacent and perpendicularly to perforated sections 312. Second punched holes 314 attach additional head stops (not shown) allowing for different door opening heights and different operating systems. Second punched holes 314 allow customization based on specific installation requirements.

Further, head stop 310 presents a gap 316 at the intersection with bracket body 302. Gap 316 allows for bending of head stop 310 with respect to bracket body 302. In other words, gap 316 creates a natural hinge point that facilitates precise positioning without requiring additional components. Furthermore, bracket body 302 includes a plurality of guide tabs 318. Guide tabs 318 help to connect bracket body 302 and common components of roll-up door system 100 to vertical guides 112.

Bracket assembly 300 design offers advantages in certain door configurations. The lower positioning of head stop 310 provides better control of door movement in some installations. The extended configuration may be particularly beneficial for high-clearance doors or installations where the head stop needs to be positioned away from other door components. The integrated construction eliminates the need for separate components and fasteners, reducing installation complexity and potential failure points. Extending section 308 is provided to support larger and heavier doors. The strategic placement of head stop 310 relative to bracket body 302 optimizes the force distribution during door operation, extending the service life of both roll-up door 102 and bracket assembly 300. The extended design also provides improved access for maintenance and adjustment operations.

Figure 10A:
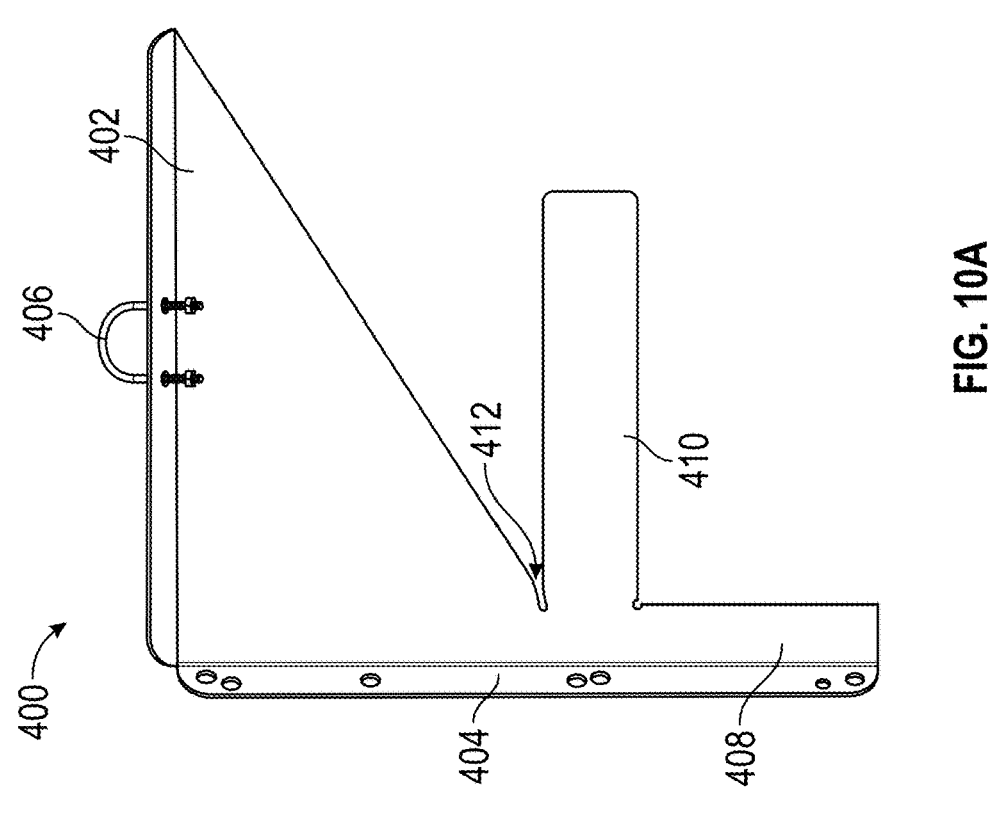
FIG. 10A and FIG. 10B illustrate a door operator bracket assembly with, and without an extension, respectively, in accordance with another embodiment of the present invention.

FIG. 10A shows a front view of a door operator bracket assembly 400 with an extended section 408 having a head stop 410, in accordance with yet another embodiment of the present invention. Bracket assembly 400 includes a bracket body 402. Bracket body 402 includes a folded hem 404. Bracket body 402 includes a U-shaped member 406 at the top. U-shaped member 406 clamps onto axle 106 of roll-up door system 100. Bracket body 402 has an extending section 408 that extends below the main body, creating an L-shaped or angled profile, which provides additional mounting options. Extending section 408 is provided to support larger and heavier doors. In the present embodiment, extending section 408 includes a head stop 410 that directly incorporates, manufactures, stamps, molds, or permanently attaches to extending section 408 without the use of fasteners, bolts, staples or other attachment devices. Head stop 410 extends from extending section 408 and positions below bracket body 402. Head stop 410 presents a gap 412 at the intersection with bracket body 402 and/or extending section 408. Gap 412 allows for bending of head stop 410 with respect to bracket body 402. In other words, gap 412 creates a natural hinge point that facilitates precise positioning without requiring additional components.

The above configuration is useful for door systems that require operator mechanisms, as bracket assembly 400 integrates head stop 410 function with support for door operation equipment. The unified construction eliminates the need for separate components and fasteners, reducing installation time and minimizing potential failure points. The strategic positioning of head stop 410 relative to the vertical guides ensures proper alignment and coordinated operation, improving system reliability and reducing maintenance requirements. The integrated design also reduces the overall footprint of the assembly, allowing installation in space-constrained environments.

Figure 10B:
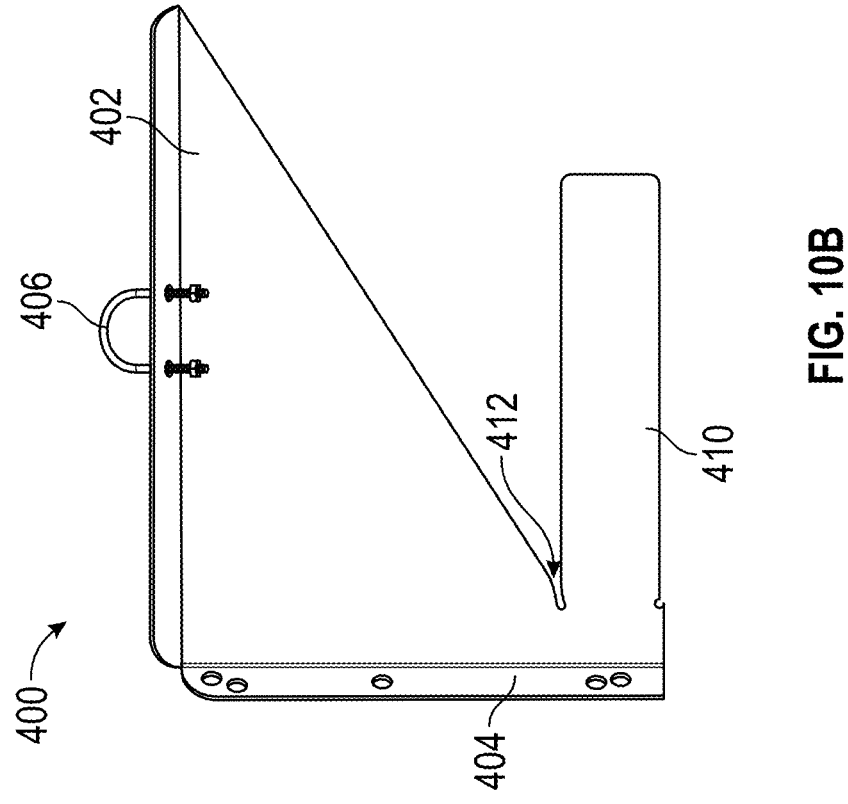

FIG. 10B shows another configuration of door operator bracket assembly 400 without extending section 408, in accordance with one embodiment of the present invention. FIG. 10A and FIG. 10B are shown to illustrate that door operator bracket assembly 400 can come in variety of shapes i.e., with or without extension 408, and other possible combinations can be made using the presently disclosed door operator bracket assembly 400. A person skilled in the art understands that all such modifications fall within the scope of the present invention.

Figure 11:
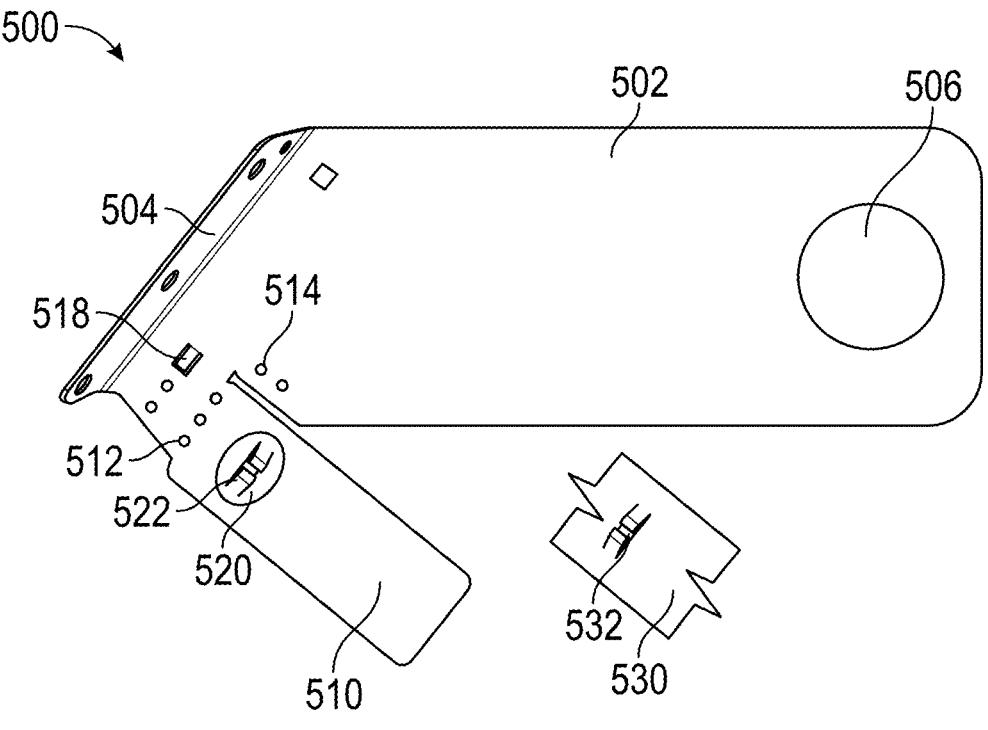
FIG. 11 illustrates a front view of a bracket assembly with integrated self-locking head stop assembly features, in accordance with another embodiment of the present invention.

FIG. 11 shows a bracket assembly 500 with integrated self-locking head stop assembly features, in accordance with another embodiment of the present invention. Bracket assembly 500 includes a bracket body 502 constructed from stamped steel, die-cast aluminum, or other materials with sufficient thickness to withstand operational stresses. Bracket body 502 includes a folded hem 504 formed around the perimeter of bracket body 502. Folded hem 504 adds rigidity and enhances operator safety during installation and operation. Folded hem 504 includes bolt holes for connecting bracket body 502 to a door jamb, header or support structure, to the side of or above the header to mount, raise, and lower a roll-up door.

Bracket body 502 includes a bracket opening 506 that receives an axle to which a bracket stop connects. Bracket opening 506 indicates a circumferential hole formed in bracket body 502 through which the axle passes to allow attachment tabs and a tensioning wheel to rotate freely. The bracket stop may be a cap that uses a retaining ring or self-cutting/threading fastener to secure bracket body 502 within or on the axle, ensuring that bracket body 502 can only move the required space on the axle. The bracket stop acts as a safety cover during installation and adjustments to protect the operator from injury and removes the need to drill holes in the axle and use a cotter pin or other fasteners.

Bracket assembly 500 includes a head stop 510 that directly incorporates, manufactures, stamps, molds, or permanently attaches to bracket body 502 without the use of fasteners, bolts, staples, or other attachment devices. Head stop 510 comes in a rectangular, square, triangular, or any other shape and extends at the bottom of bracket body 502, forming a continuous piece with the main structure and eliminating potential failure points that exist with separate components. Head stop 510 includes a plurality of perforated sections 512 indicating a series of small, precisely spaced holes that create a hinge line in the material of head stop 510. Perforated sections 512 allow head stop 510 to bend or fold into position, creating a living hinge effect that maintains structural integrity while enabling adjustment.

Head stop 510 includes a plurality of first punched holes 514 that are circular or slotted to accommodate various fastener types. First punched holes 514 position away from perforated sections 512 and are configured to receive fasteners to secure head stop 510 to vertical guides or guide rails once head stop 510 bends into position. Head stop 510 includes guide tabs 518 that help connect bracket body 502 and common components of the roll-up door system to vertical guides.

Head stop 510 includes a tab section 520 having interlocking tabs 522 stamped or formed integrally with head stop 510. Tab section 530 shows a side angled view of interlocking tabs 532 stamped or formed integrally with head stop 510. Interlocking tabs 522 and tabs 532 comprise a plurality of interlocking tongues, protrusions, or snap-fit tabs configured to self-engage upon bending or rotation of head stop 510 into its operative position, thereby locking head stop 510 in place and eliminating the need for additional fasteners.

Figure 12:
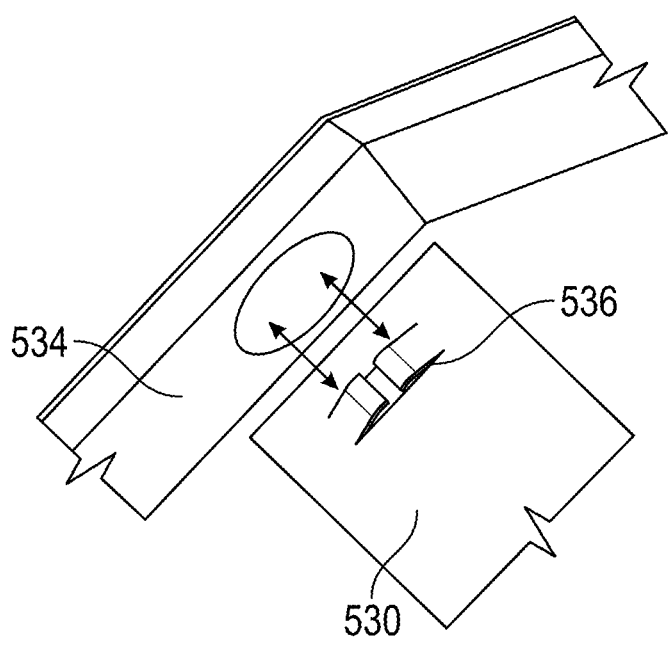
FIG. 12 illustrates a detailed view of the self-locking tab mechanism of the bracket assembly, in accordance with another embodiment of the present invention.

FIG. 12 illustrates tab section 530 connected to a guide rail 534. Interlocking tabs 532 self-engage into guide rail 534 securing head stop 510 in place without requiring additional fasteners. Interlocking tabs 532 include angled, curved, or otherwise shaped deflection surfaces configured to elastically deform during bending and self-engage upon return to a neutral position, thereby locking head stop 510 without fasteners. The locking tabs are formed integrally with bracket body 502 and are capable of being releasable, reusable, or permanently engaged upon subsequent bending or service.

The self-locking head stop assembly design of bracket assembly 500 may provide enhanced installation efficiency by eliminating the need for separate fasteners while maintaining secure attachment to the guide rail system. The integrated interlocking tabs 522 and/or 532 may allow for quick installation and removal during maintenance operations. Head stop 510 includes reinforcement ribs or stiffeners positioned adjacent the interlocking features to distribute load and prevent deformation during impact. The elastically deformable interlocking tabs may accommodate slight variations in guide rail 534 dimensions while maintaining consistent engagement force. Further, guide rail 534 includes the interlocking tabs 536 that self-engage into the head stop 510 via interlocking tabs 522.

Figures 13, 14:
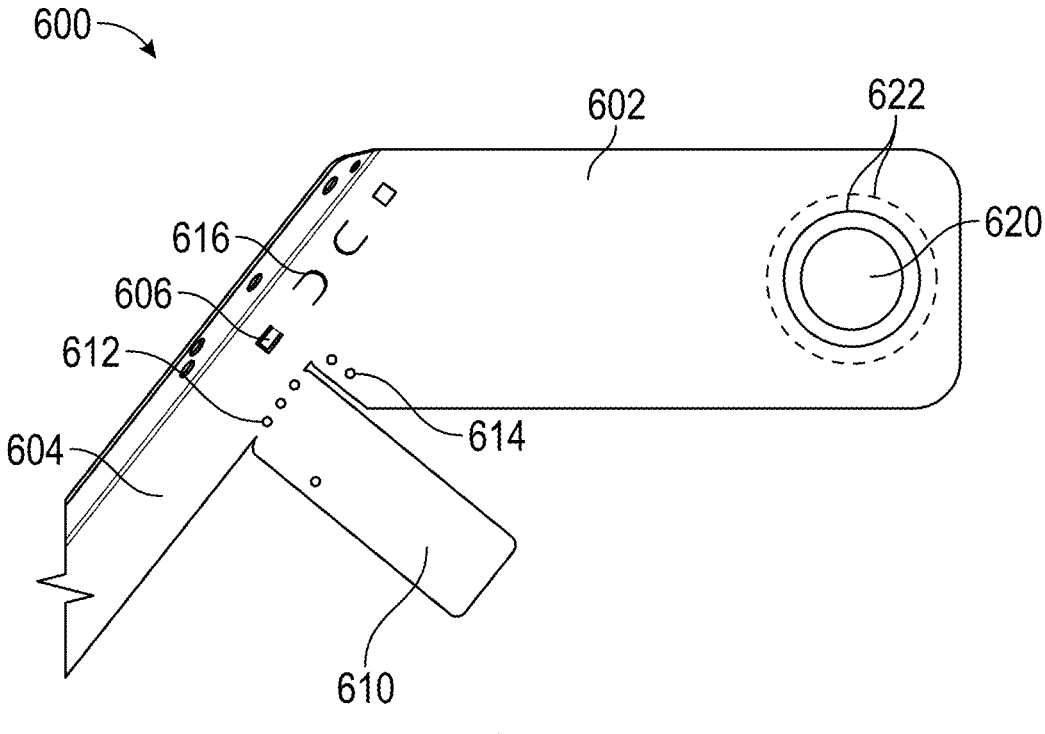
FIG. 13 illustrates a front view of a universal bracket assembly with removable knockouts and breakaway tabs, in accordance with another embodiment of the present invention.
FIG. 14 illustrates a perspective view of an axle assembly with push fit release collar, in accordance with another embodiment of the present invention.

FIG. 13 shows a front view of bracket assembly 600 for a roll-up door system, bracket assembly 600 being universal, in accordance with another embodiment of the present invention. Bracket assembly 600 includes a bracket body 602 with a folded hem 604 formed around its perimeter. Bracket body 602 includes a plurality of guide tabs 616 that connect bracket body 602 to vertical guides of the roll-up door system. Bracket body 602 also includes a plurality of breakaway tabs 606 positioned on bracket body 602. Breakaway tabs 606 are configured to be selectively removed based on installation requirements, allowing customization of the bracket assembly for specific applications. Breakaway tabs 606 include integral reinforcement features configured to maintain structural integrity when unremoved and are dimensioned to provide a range of fitment options for differing door systems or guide profiles.

A head stop 610 extends from bracket body 602. Head stop 610 includes a plurality of first punched holes 612 and a plurality of second punched holes 614. First punched holes 612 are configured to receive fasteners to secure head stop 610 to vertical guides. Second punched holes 614 are configured to receive fasteners to attach additional head stops or components, providing flexibility for different door opening heights and operating systems.

Bracket body 602 includes a bracket opening 620 that receives an axle and functions as an axle bearing seat. Bracket opening 620 is surrounded by a plurality of removable knockouts 622 positioned around the axle bearing seat and adjacent structural portions. Removable knockouts 622 are defined by perforation lines or reduced-thickness zones enabling manual removal with or without tools and are configured to be selectively removed to accommodate multiple axle diameters, door configurations, or guide profiles. Removable knockouts 622 are dimensioned to provide a range of fitment options for differing axle sizes and are configured to accept modular inserts, sensors, or fastener housings when removed.

FIG. 14 illustrates a perspective view of axle assembly 650. Axle assembly 650 includes an axle cap 652 and a push fit release collar 654. Push fit release collar 654 is positioned on axle cap 652 and provides a quick-release mechanism for securing or releasing axle assembly 650 and bracket body 602 without requiring additional fasteners or tools. The push fit release collar 654 may enable rapid installation and removal of the axle assembly and bracket body during maintenance operations while maintaining secure engagement during normal door operation.

The removable knockout and breakaway tab features of bracket assembly 600 may provide enhanced versatility for field installation, allowing technicians to customize the bracket for specific door configurations without requiring multiple bracket models. The axle assembly 650 with push fit release collar 654 may complement the bracket assembly by providing tool-free axle installation (without fasteners) and removal capabilities.

Figure 15:
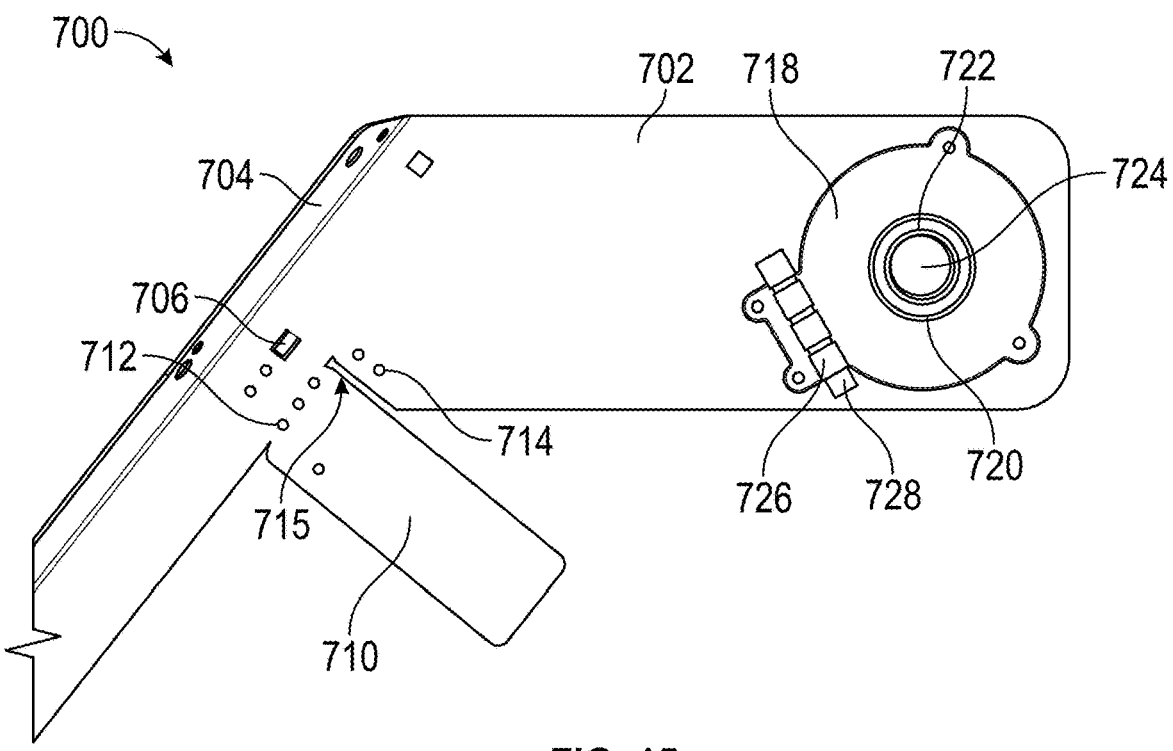
FIG. 15 illustrates a front view of a bracket assembly with a bolt cartridge configuration, in accordance with another embodiment of the present invention.

FIG. 15 shows a front view of bracket assembly 700, in accordance with another embodiment of the present invention. Bracket assembly 700 includes a bracket body 702 with a folded hem 704 formed around its perimeter. Folded hem 704 adds rigidity and enhances operator safety during installation and operation. Bracket body 702 includes a plurality of breakaway tabs 706 positioned on bracket body 702. Breakaway tabs 706 are configured to be selectively removed based on installation requirements, allowing customization of bracket assembly 700 for specific applications.

Bracket assembly 700 includes a head stop 710 that extends from bracket body 702. Head stop 710 includes a plurality of perforated sections 712 that create a hinge line in the material of head stop 710. Perforated sections 712 comprise a series of small, precisely spaced holes that allow head stop 710 to bend or fold into position relative to bracket body 702. Head stop 710 includes a plurality of first punched holes 714 positioned away from perforated sections 712. First punched holes 714 are configured to receive fasteners to secure head stop 710 to vertical guides once head stop 710 is bent into its operative position. A gap 715 is present at the intersection between head stop 710 and bracket body 702, creating a natural hinge point that facilitates bending of head stop 710 with respect to bracket body 702.

Bracket assembly 700 includes a bolt cartridge 718 provided on bracket body 702. Bolt cartridge 718 is affixed onto bracket body 702 and provides a mounting interface for securing components to bracket assembly 700. The bolt cartridge 718 may be permanently attached through welding, brazing, or mechanical fastening, or may be removably connected to allow for replacement or adjustment during installation and maintenance operations.

Figure 16:
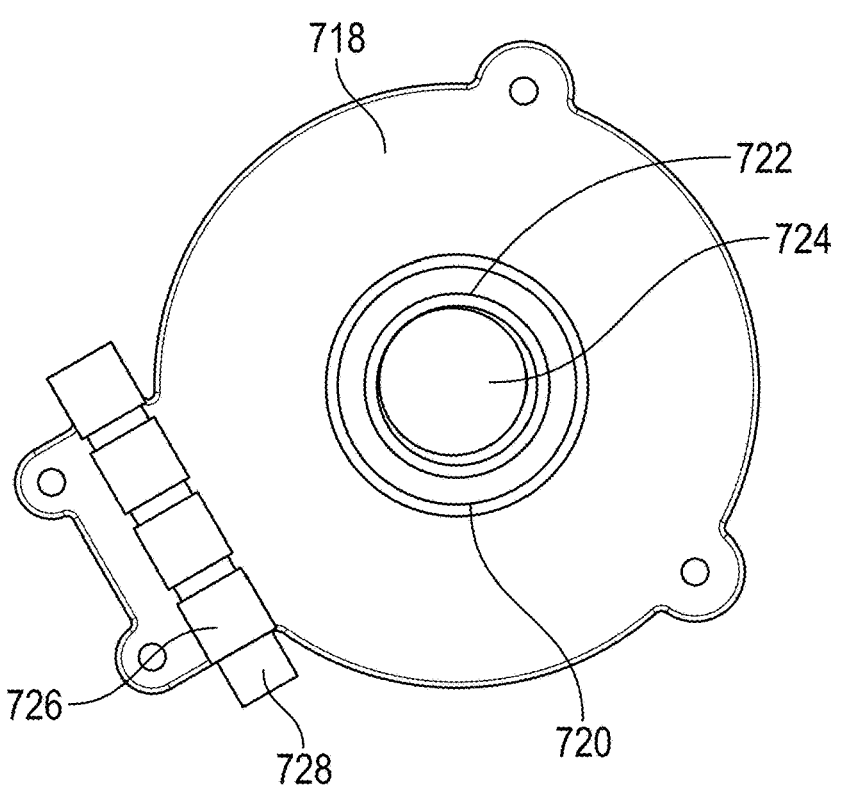
FIG. 16 illustrates a detailed view of the bolt cartridge and axle assembly of bracket assembly, in accordance with another embodiment of the present invention.

FIG. 16 shows bolt cartridge 718 in accordance with one embodiment of the present invention. Bolt cartridge 718 encompasses a bracket opening 720. Bracket opening 720 receives an axle 722. Bracket opening 720 indicates a circumferential hole formed in bolt cartridge 718 through which axle 722 passes to allow rotational movement of associated components. Axle 722 has an axle cap 724 affixed at the end of axle 722. Axle cap 724 serves as a depth stop for accurate axle positioning and as a safety cover during installation and adjustments to protect the operator from injury.

Further, bracket body 702 includes an attachment tab 726 having a tensioning drive 728. Tensioning drive 728 is positioned on attachment tab 726 and is configured for adjusting tension in the roll-up door system. Tensioning drive 728 may comprise various mechanisms including a worm screw assembly, ratchet mechanism, or other tensioning systems for controlling door operation. Attachment tab 726 provides a mounting surface for tensioning drive 728 and may be formed integrally with bracket body 702 or attached as a separate component.

Figure 17:
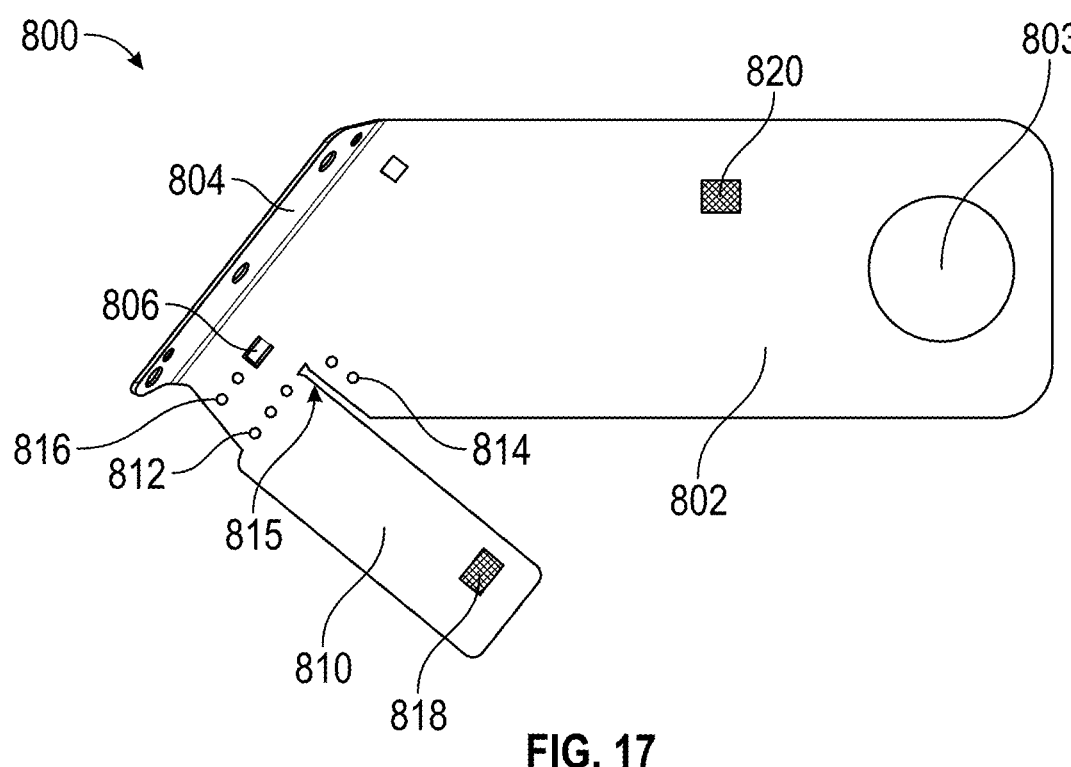
FIG. 17 illustrates a front view of a bracket assembly with integrated sensor capabilities, in accordance with another embodiment of the present invention.

FIG. 17 shows a rear view of bracket assembly 800, in accordance with another embodiment of the present invention. Bracket assembly 800 includes a bracket body 802 with a folded hem 804 formed around its perimeter. Bracket body 802 includes a bracket opening 803 that receives an axle and functions as an axle bearing seat. Bracket body 802 also includes a plurality of breakaway tabs 806 positioned on bracket body 802. Breakaway tabs 806 are configured to be selectively removed based on installation requirements, allowing customization of bracket assembly 800 for specific applications.

Bracket assembly 800 includes a head stop 810 extending from bracket body 802. Head stop 810 includes a plurality of perforated sections 812 that create a hinge line in the material of head stop 810. Perforated sections 812 allow head stop 810 to bend or fold into position relative to bracket body 802. Head stop 810 includes a plurality of first punched holes 814 positioned away from perforated sections 812. First punched holes 814 are configured to receive fasteners to secure head stop 810 to vertical guides once head stop 810 is bent into position. A gap 815 is present at the intersection between head stop 810 and bracket body 802, creating a natural hinge point that facilitates bending of head stop 810 with respect to bracket body 802. Head stop 810 also includes a plurality of second punched holes 816 positioned adjacent to perforated sections 812. Second punched holes

816 are configured to receive fasteners to attach additional head stops or components, providing flexibility for different door opening heights and operating systems.

Bracket assembly 800 includes a first sensor 818 positioned on head stop 810. First sensor 818 is configured to monitor operational parameters of the roll-up door system, such as door position, movement, or alignment. Bracket assembly 800 also includes a second sensor 820 positioned on bracket body 802. Second sensor 820 may be configured to monitor parameters such as spring torque, tensioning load, or vibration amplitude. First sensor 818 and second sensor 820 enable real-time monitoring of door system performance and may facilitate integration with building management systems or access control systems.

Figure 18:
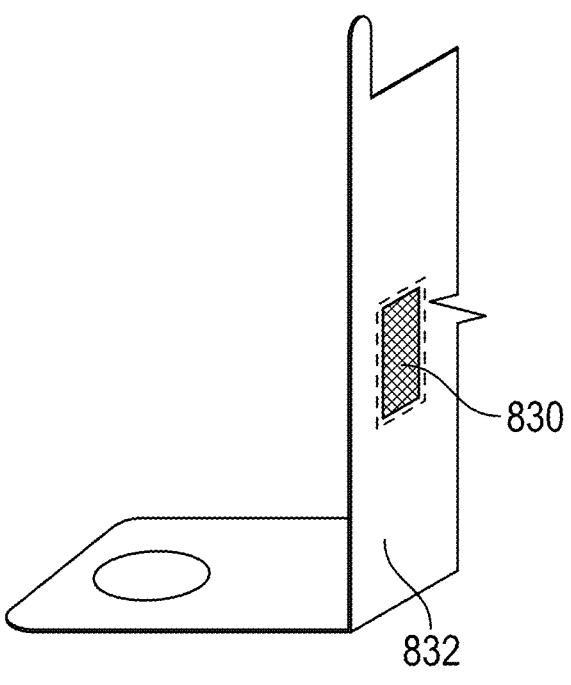
FIG. 18 illustrates a perspective view of a bottom bar with a third sensor positioned on a back surface, in accordance with another embodiment of the present invention.

Bracket assembly 800 includes an optional third sensor 830. FIG. 18 shows an optional third sensor 830 positioned on a back of a bottom bar 832, in accordance with one embodiment of the present invention. Third sensor 830 may be configured to monitor additional operational parameters or provide redundant sensing capabilities for enhanced system reliability. Bottom bar 832 provides a mounting surface for third sensor 830 and may be formed integrally with bracket assembly 800 or attached as a separate component. The positioning of third sensor 830 on the back of bottom bar 832 may protect the sensor from environmental exposure while maintaining sensing functionality.

The integrated bracket assembly with head stop may be further enhanced through various embodiments that incorporate advanced manufacturing techniques, internal tensioning systems, and smart technology integration. These embodiments may provide improved functionality, serviceability, and adaptability while maintaining the unified construction benefits of the present invention. The enhanced configurations may address specific operational challenges in industrial and commercial door applications, including extreme environmental conditions, high-frequency operation cycles, and integration with automated building management systems.

In some aspects, the bracket assembly may include a unitary bracket body defining an internal cavity that houses a torque-adjusting member. The bracket body may incorporate an axle-bearing seat and an integrated head stop, where the head stop forms from and remains continuous with the bracket body to limit travel of a door curtain. The internal cavity may be precisely dimensioned to accommodate various torque-adjusting mechanisms while maintaining optimal clearances for thermal expansion and operational movement. The cavity walls may include mounting bosses, threaded inserts, or retention features to secure the torque-adjusting member without requiring additional fasteners. The torque-adjusting member may be enclosed within the bracket body, providing protection from environmental elements including dust, moisture, salt spray, and temperature extremes while maintaining accessibility for adjustment operations through sealed access ports or removable covers. This enclosed configuration may eliminate external exposure of tensioning components, reducing maintenance requirements compared to traditional exposed mechanisms and improving system reliability through protection from contamination and mechanical damage.

The torque-adjusting member may comprise various mechanisms including a worm screw and worm wheel assembly, ratchet and pawl systems with incremental adjustment capabilities, cam ratchet mechanisms providing continuous or stepped adjustment, Geneva mechanisms, torsion elements including coil springs or torsion bars, or other tensioning mechanisms such as hydraulic or pneumatic actuators. The torque-adjusting member, which may also be referred to as a tensioning mechanism, tensioning drive, or tensioning system, may include a worm screw assembly with self-locking features having lead angles less than the friction angle to prevent back-driving under load. In some cases, the torque-adjusting member may include an anti-back-drive clutch or one-way retention mechanism incorporating spring-loaded pawls, roller clutches, or wrap springs to maintain tension under load, preventing unwanted relaxation of the door system during operation and ensuring consistent door positioning. The torque-adjusting member may be configured as a removable or replaceable cartridge that can be inserted or attached into the internal cavity of the bracket body through threaded connections, bayonet mounts, or snap-fit assemblies, facilitating maintenance and component replacement without requiring complete bracket replacement and reducing service time.

The bracket body may include reinforcement ribs formed adjacent the internal cavity and bearing seat to distribute load and prevent crack propagation. The ribs may extend radially from the bearing seat or follow stress flow patterns to redirect loads away from critical areas. These structural enhancements may improve the durability of the assembly under repeated operational stresses while maintaining the integrated design benefits and adding minimal weight to the overall assembly. The bracket body and integrated head stop may be formed as a single, continuous piece of material through progressive stamping, hydroforming, or casting processes to define a unitary structure with seamless transitions between components, or alternatively, the bracket body may comprise multiple elements permanently joined together through welding, brazing, adhesive bonding, or mechanical interlocking to function as a unitary housing for the enclosed tensioning mechanism while allowing for material optimization in different regions.

In some embodiments, the bracket body may include two or more differing materials permanently bonded, fused, or co-formed during manufacturing to create an inseparable structural assembly. The bracket body may comprise an outer structural portion formed from high-strength steel or aluminum alloy and an inner insert or housing formed from bronze, polymer, or composite materials to achieve desired mechanical properties such as wear resistance, lubrication retention, or electrical isolation. One material may be over-molded, bonded through adhesives or primers, laminated using intermediate layers, or otherwise formed around another through co-injection molding or insert molding to create an integrated composite structure.

The bracket assembly may incorporate a quick-release axle stop mechanism that includes a push-button actuator, spring-pin detent system, quarter-turn cam lock, push fit release collar, push to connect fitting, or other tightening or release feature configured to releasably secure the axle or bracket without requiring fasteners or tools. The push-button mechanism may include a spring-loaded plunger with engagement balls or pins that retract into grooves or detents in the axle when activated. The detent system may include a spring-loaded push button or plunger with actuation forces, and may incorporate a safety catch, twist-lock feature, or lock reset mechanism to prevent accidental release during operation. The safety catch may require a two-step operation such as lifting and pressing or rotating and pushing to ensure intentional activation. The release interface may be configured for tool-free manual operation with ergonomic button shapes and non-slip surfaces, with the quick-release mechanism integrated into or onto the bracket stop mechanism body through threaded connections, pressfits, or snap assemblies. This configuration may enable rapid installation and removal of the axle assembly during maintenance operations while maintaining secure engagement during normal door operation, eliminating the need for cotter pins, set screws, or other traditional fastening methods.

In some aspects, the bracket assembly may include sensor integration capabilities through an integrated sensor cavity or mounting port formed in, on, or around the bracket body and positioned adjacent to an axle opening or internal tensioning cavity. The sensor cavity may be machined, molded, or formed during the primary manufacturing process and may include precise dimensional tolerances to accommodate standard sensor packages. The sensor cavity or mounting port may be integral to, or mechanically attached to, the bracket structure through welding, brazing, or mechanical fastening and configured to receive and retain various sensor types including torque sensors, strain gauges with sensitivity to micro-strain levels, position sensors, locked and unlocked sensors, or vibration sensors. The bracket may further include an electrical interface or smart-device connector configured to transmit sensor or control signals to an external operator, access controller, or building management system for real-time monitoring and control.

The sensor cavity may include cable routing channels extending through the bracket body configured to protect or isolate electrical conductors from environmental exposure, mechanical damage, or vibration. These cable routing channels may be sealed using gaskets, O-rings, or potting compounds, preventing ingress of dust particles. The sensor cavity or mounting location may include a co-molded, bonded, or fitted insert formed of materials such as thermoplastic elastomers, silicone rubber, or polyurethane configured to support and isolate the sensor from vibration amplitudes, or mechanical shock events, while maintaining sensor accuracy.

The sensor cavity may be configured with open access for easy sensor installation or sealed by a removable cover featuring threaded connections, gasket seals, or integrated barriers, preventing ingress of dust, moisture, or debris during door operation while maintaining sensor accessibility for calibration or replacement. The smart-device connector may be configured to enable selective locking, unlocking, or actuation of the door or related access system upon receiving authenticated signals.

The manufacturing process for these enhanced bracket assemblies may involve progressive stamping or over-molding steps configured to form a unitary or multi-component bracket body with an integrated or attachable head stop, internal cavity, and optional insert, all producible within a single production cycle. Sequential stamping operations may form hinge lines with perforation patterns optimized for specific bending radii, create reinforcement ribs, and establish mounting features before over-molding processes that inject thermoplastic or thermoset materials. The over-molded insert may be applied in the same die process without secondary assembly operations, utilizing multi-shot injection molding or insert molding techniques. The completed part may exit the production line ready for direct installation without welding, brazing, or mechanical fasteners, streamlining the manufacturing process and reducing production costs.

These various embodiments may provide enhanced versatility for field installation, allowing technicians to customize the bracket for specific door configurations. The sensor-ready features may enable integration with building automation systems and provide real-time monitoring capabilities for predictive maintenance algorithms that can detect impending failures in advance, operational optimization through energy usage tracking and cycle counting, and security monitoring through unauthorized access detection.

The present invention encompasses a unitary bracket assembly comprising a bracket body that defines an internal cavity for housing a torque-adjusting member. The bracket body incorporates an axle-bearing seat and an integrated head stop, where the head stop is formed from and remains continuous with the bracket body to limit travel of a door curtain. The head stop comprises a plurality of perforated sections that create a hinge line in the material of the head stop to allow bending or rotation of the head stop relative to the bracket body.

The torque-adjusting member comprises various mechanisms including a worm screw and worm wheel assembly, ratchet and pawl systems, cam ratchet mechanisms, Geneva mechanisms, torsion elements, or other tensioning mechanisms. In some aspects, the torque-adjusting member comprises an anti-back-drive clutch or one-way retention mechanism to maintain tension under load. The torque-adjusting member is configured as a removable or replaceable cartridge that can be inserted or attached into the internal cavity of the bracket body.

The bracket assembly further comprises reinforcement ribs formed adjacent to the internal cavity and bearing seat to distribute load and prevent crack propagation. The bracket body and integrated head stop are formed as a single, continuous piece of material to define a unitary structure. In some embodiments, the bracket body comprises two or more differing materials permanently bonded, fused, or co-formed during manufacturing to create an inseparable structural assembly.

The bracket assembly further comprises a mounting flange or interface configured to attach the bracket assembly to a door jamb, frame, or support structure. The bracket body and the head stop form a gap at an intersection between the head stop and the bracket body. The perforated sections comprise a series of small, precisely spaced holes that enable the head stop to bend or fold into position.

In another aspect, the bracket assembly comprises a bracket body and a head stop extending from the bracket body, wherein the head stop comprises a plurality of perforated sections that create a hinge line in the material of the head stop to allow bending or rotation of the head stop relative to the bracket body. The bracket assembly includes an axle stop mechanism configured to releasably secure an axle to the bracket body without requiring fasteners or tools. The axle stop mechanism includes a spring-loaded push button or plunger, and includes a safety catch or lock reset feature. The axle stop mechanism is configured for tool-free manual operation and is integrated into or onto a bracket stop of the bracket body.

In a further aspect, the bracket assembly comprises a bracket body and a head stop extending from the bracket body, wherein the head stop comprises a plurality of perforated sections that create a hinge line in the material of the head stop to allow bending or rotation of the head stop relative to the bracket body. The bracket assembly comprises an integrated sensor cavity or mounting port formed in, on, or around the bracket body and positioned adjacent to an axle opening. The sensors enable detection of movement or operational conditions associated with the rotation of the axle or actuation of the door. The sensor cavity or mounting port is integral to, or mechanically attached to, the bracket body and is configured to receive and retain a torque, strain, position, or vibration sensor. The bracket further comprises an interface configured to transmit sensor or control signals to an external access controller.

The sensor cavity comprises cable routing channels extending through the bracket body configured to protect or isolate electrical conductors from environmental exposure, mechanical damage, or vibration. The cable routing channels are sealed to prevent ingress of dust or moisture. The sensor cavity or mounting location comprises a co-molded, bonded, or fitted insert formed of a material configured to support and isolate the sensor from vibration, impact, or mechanical shock. The interface is configured to enable selective locking, unlocking, or actuation of a door or related access system upon receiving an authenticated signal from a remote-control device.

Although the above description is explained illustrating one head stop integrated at the bottom of the bracket body, two or more head stops may also be integrated into the bracket body without departing from the scope of the present invention. Any modifications to the described bracket assembly fall within the scope of present invention.

In all of the above embodiments, the integrated design of the bracket assembly and head stop offers several benefits. These benefits include simplified installation, reduced part count, and improved reliability compared to traditional separate component designs. The bracket assemblies can be used with tensioning brackets, non-tensioning brackets, counterbalancing systems, and/or mounting assemblies for overhead doors and/or opening and closable pass-through entryways.

The integrated bracket assembly with head stop design offers significant advantages over prior art configurations. By combining multiple components into a single, unified structure, the present invention reduces installation time and complexity. This integration can eliminate the need for separate fasteners to connect the head stop and bracket body, potentially decreasing the risk of misalignment during installation and loosening of connections over time due to door vibration and movement. The unitary construction may also enhance overall system reliability by reducing the number of potential failure points. The bracket assembly secures moveable panels, curtains, sheets, flexible materials or materials that allow for passable entry or exit within vertical or horizontal guide/track support systems.

Furthermore, the innovative design incorporating perforated sections and strategically placed punched holes may provide installers with greater flexibility in customizing the assembly for specific door configurations. This adaptability can allow on-site adjustments without the need for additional parts or tools, potentially streamlining the installation process and reducing inventory management challenges. The integrated tensioning mechanisms and reinforced structures may also contribute to improved durability and performance of the door system over its operational lifetime, potentially reducing maintenance requirements and extending service intervals. The bracket assembly can accommodate additional brackets, mounts, and/or tensioners to be separately or additionally added, allowing for different operating/door systems.

A person skilled in the art appreciates that the bracket assembly can come in a variety of shapes and sizes depending on the need and comfort of the user. Further, many changes in the design and placement of components may take place without deviating from the scope of the presently disclosed bracket assembly.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A bracket assembly, comprising:
a bracket body defining an internal cavity housing a torque-adjusting member, said bracket body incorporating an axle-bearing seat and an integrated head stop, wherein said head stop is formed from and continuous with said bracket body to limit travel of a door curtain, and wherein said head stop comprises a plurality of perforated sections that create a hinge line in the material of said head stop to allow bending or rotation of said head stop relative to said bracket body.

2. The bracket assembly of claim 1, wherein said torque-adjusting member comprises a worm screw and worm wheel, ratchet and pawl, cam ratchet, Geneva mechanism, torsion element, or other tensioning mechanism.

3. The bracket assembly of claim 1, wherein said torque-adjusting member comprises an anti-back-drive clutch or one-way retention mechanism to maintain tension under load.

4. The bracket assembly of claim 1, wherein said torque-adjusting member is configured to be a removable or replaceable cartridge insertable or attachable into said internal cavity of said bracket body.

5. The bracket assembly of claim 1, further comprising reinforcement ribs formed adjacent to said internal cavity and bearing seat to distribute load and prevent crack propagation.

6. The bracket assembly of claim 1, wherein said bracket body and integrated head stop are formed as a single, continuous piece of material to define a unitary structure.

7. The bracket assembly of claim 1, wherein said bracket body comprises two or more differing materials permanently bonded, fused, or co-formed during manufacturing to create an inseparable structural assembly.

8. The bracket assembly of claim 1, further comprising a mounting flange or interface configured to attach said bracket assembly to a door jamb, frame, or support structure.

9. The bracket assembly of claim 1, wherein said bracket body and said head stop form a gap at an intersection between said head stop and said bracket body.

10. The bracket assembly of claim 1, wherein said perforated sections comprise a series of small, precisely spaced holes that enable said head stop to bend or fold into position.

11. The bracket assembly of claim 1, further comprising a bolt cartridge positioned on said bracket body and configured to provide a mounting interface for securing components to said bracket assembly.

12. A bracket assembly, comprising:
a bracket body; and
a head stop extending from said bracket body,
wherein said head stop comprises a plurality of perforated sections that create a hinge line in the material of said head stop to allow bending or rotation of said head stop relative to said bracket body, and wherein said bracket assembly comprises an axle stop mechanism configured to releasably secure an axle to said bracket body without requiring fasteners or tools.

13. The bracket assembly of claim 12, wherein said axle stop mechanism comprises a spring-loaded push button or plunger, or snap-fit element, interference-fit element, push-to-fit connector, or other releasable retention feature.

14. The bracket assembly of claim 12, wherein said axle stop mechanism is integrated into or onto a bracket stop of said bracket body.

15. A bracket assembly, comprising:
a bracket body; and
a head stop extending from said bracket body,
wherein said head stop comprises a plurality of perforated sections that create a hinge line in the material of said head stop to allow bending or rotation of said head stop relative to said bracket body, and wherein said bracket assembly comprises: an integrated sensor cavity or mounting port formed in, on, or around said bracket body and positioned adjacent to an axle opening or internal tensioning cavity; wherein said sensor cavity or mounting port is integral to, or mechanically attached to, said bracket body and is configured to receive and retain a torque, strain, position, or vibration sensor; and wherein said bracket further comprises an interface configured to transmit sensor or control signals to an external access controller.

16. The bracket assembly of claim 15, wherein said sensor cavity comprises cable routing channels extending through said bracket body configured to protect or isolate electrical conductors from environmental exposure, mechanical damage, or vibration.

17. The bracket assembly of claim 16, wherein said cable routing channels are sealed to prevent ingress of dust or moisture, and wherein said sensor cavity or mounting location comprises a co-molded, bonded, or fitted insert formed of a material configured to support and isolate said sensor from vibration, impact, or mechanical shock.

18. The bracket assembly of claim 15, wherein said interface is configured to enable selective locking, unlocking, or actuation of a door or related access system upon receiving an authenticated signal from a remote-control device.

19. The bracket assembly of claim 15, wherein said bracket assembly comprises a first sensor positioned on said bracket body and a second sensor positioned on said head stop, said first and second sensors configured to monitor operational parameters of a roll-up door system.

20. The bracket assembly of claim 19, further comprising a third sensor positioned on a bottom bar, said third sensor configured to provide additional monitoring capabilities for enhanced system reliability.

\* \* \* \* \*